US009665533B2

(12) United States Patent
Lowery et al.

(10) Patent No.: US 9,665,533 B2
(45) Date of Patent: May 30, 2017

(54) BLOB POOLS, SELECTORS, AND COMMAND SET IMPLEMENTED WITHIN A MEMORY APPLIANCE FOR ACCESSING MEMORY

(71) Applicant: Rambus Inc., Sunnyvale, CA (US)

(72) Inventors: Keith Lowery, Garland, TX (US); Vlad Fruchter, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 104 days.

(21) Appl. No.: 14/539,662

(22) Filed: Nov. 12, 2014

(65) Prior Publication Data

US 2015/0177990 A1 Jun. 25, 2015

Related U.S. Application Data

(60) Provisional application No. 61/919,318, filed on Dec. 20, 2013, provisional application No. 61/952,784, (Continued)

(51) Int. Cl.
*G06F 12/00* (2006.01)
*G06F 13/00* (2006.01)
*G06F 15/173* (2006.01)
*G06F 3/06* (2006.01)
*G06F 12/06* (2006.01)
(Continued)

(52) U.S. Cl.
CPC ...... *G06F 15/17331* (2013.01); *G06F 3/0619* (2013.01); *G06F 12/0653* (2013.01); *G06F 12/0692* (2013.01); *G06F 13/16* (2013.01); *H04L 67/1097* (2013.01); *H04L 67/2842* (2013.01)

(58) Field of Classification Search
None
See application file for complete search history.

(56) References Cited

U.S. PATENT DOCUMENTS 6,295,571 B1 9/2001 Scardamalia et al.
6,467,011 B2 10/2002 Scardamalia et al.
(Continued)

FOREIGN PATENT DOCUMENTS

EP 0644548 A2 3/1995
EP 0593100 B1 1/2003
(Continued)

OTHER PUBLICATIONS

Blott et al., "Achieving 10Gbps Line-Rate Key-Value Stores With FPGAs," Proceedings of the 5th USENIX Workshop on Hot Topics in Cloud Computing, Jun. 2013, pp. 1-6. 6 pages.
(Continued)

*Primary Examiner* — Sean D Rossiter
(74) *Attorney, Agent, or Firm* — Lowenstein Sandler LLP

(57) ABSTRACT

A memory appliance system is described and includes a plurality of memory devices storing data in a plurality of containers and a controller. The containers include metadata, relationship information associating a respective container with related containers, and a payload. The controller is configured to perform data operations on the payload of one of the containers, and based on the relationship information associating the respective container with related containers and the payload of related containers.

20 Claims, 13 Drawing Sheets

Related U.S. Application Data filed on Mar. 13, 2014, provisional application No. 61/952,800, filed on Mar. 13, 2014, provisional application No. 61/952,798, filed on Mar. 13, 2014, provisional application No. 61/952,778, filed on Mar. 13, 2014, provisional application No. 61/952,796, filed on Mar. 13, 2014, provisional application No. 61/990,009, filed on May 7, 2014, provisional application No. 61/990,014, filed on May 7, 2014, provisional application No. 61/990,033, filed on May 7, 2014.

(51) Int. Cl.
   *G06F 13/16*     (2006.01)
   *H04L 29/08*     (2006.01)

(56) References Cited

U.S. PATENT DOCUMENTS

| | | | |
|---|---|---|---|
| 6,892,298 | B2 | 5/2005 | West |
| 6,970,891 | B1 | 11/2005 | Deo et al. |
| 7,171,494 | B2 | 1/2007 | Karamanolis et al. |
| 7,490,211 | B2 | 2/2009 | Schnepper |
| 8,364,867 | B2 | 1/2013 | Karamcheti et al. |
| 2005/0268049 | A1* | 12/2005 | De Lange ............ G06F 12/023 711/149 |
| 2008/0082488 | A1 | 4/2008 | Terrell |
| 2012/0042204 | A1 | 2/2012 | Smith et al. |
| 2012/0106228 | A1 | 5/2012 | Lee |
| 2012/0204079 | A1 | 8/2012 | Takefman et al. |
| 2012/0206165 | A1 | 8/2012 | Ferolito et al. |
| 2012/0268982 | A1 | 10/2012 | Rajan |
| 2013/0036314 | A1 | 2/2013 | Glew et al. |
| 2013/0042056 | A1 | 2/2013 | Shats et al. |
| 2013/0117503 | A1 | 5/2013 | Nellans et al. |
| 2014/0068184 | A1* | 3/2014 | Edwards ............ G06F 3/0607 711/114 |
| 2014/0074969 | A1* | 3/2014 | Kadayam ............ H04L 67/1095 709/217 |
| 2014/0119615 | A1* | 5/2014 | Mercolino ............ G07D 7/004 382/112 |
| 2015/0160862 | A1 | 6/2015 | Blott et al. |

FOREIGN PATENT DOCUMENTS

| | | |
|---|---|---|
| EP | 1864221 B1 | 5/2010 |
| WO | WO-00-57286 A1 | 9/2000 |
| WO | WO-2010-016889 A2 | 2/2010 |
| WO | WO-2012-104847 A1 | 8/2012 |

OTHER PUBLICATIONS

Blott, Michaela, "Dataflow Architectures for 10Gbps Line-Rate Key-Value-Stores," Xilinx Research, 2013, pp. 1-25. 25 pages.

Cheriton et al., "HICAMP: Architectural Support for Efficient Concurrency-Safe Shared Structured Data Access," Proceedings of the 17th International Conference on Architectural Support for Programming Languages and Operating Systems, ASPLOS'12, Mar. 3-7, 2012, London, England, pp. 287-299. 13 pages.

Huawei Technologies Co., Ltd., "High Throughput Computing Data Center Architecture," Technical White Paper, Jun. 2014. 8 pages.

IBM, "IBM System x3750 M4 Virtual Large Memory Appliance," IBM Data Sheet, 2013. 2 pages.

Kove, "About Xpress Disk (xpd)," Kove Corporation Data Sheet, 2013. 2 pages.

Lim, Kevin Te-Ming, "Disaggregated Memory Architectures for Blade Servers," dissertation for Doctor of Philosophy (Computer Science and Engineering), University of Michigan, 2010. 148 pages.

Lim, Kevin Te-Ming, "Disaggregated Memory Architectures for Blade Servers," dissertation submitted to University of Michigan, 2010. 153 pages.

Lim, Kevin, "Disaggregated Memory for Expansion and Sharing in Blade Servers," Proceedings of the 36th Annual International Symposium on Computer Architecture, Jun. 20-24, 2009, Austin, TX, pp. 1-12. 12 pages.

Pandey et al., "DMA-Aware Memory Energy Management," The 12th International Symposium on High-Performance Computer Architecture, HPCA '06, pp. 133-144, Feb. 11-15, 2006. 12 pages.

Yoo et al., "Phoenix Rebirth: Scalable Mapreduce on a NUMA System," Proceedings of the International Symposium on Workload Characterization (IISWC), 2009, pp. 1-10. 10 pages.

PCT International Search Report and Written Opinion dated Apr. 7, 2015 in International Application No. PCT/US2014/071732. 22 pages.

\* cited by examiner

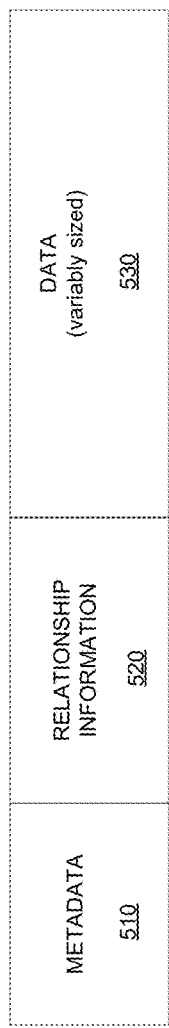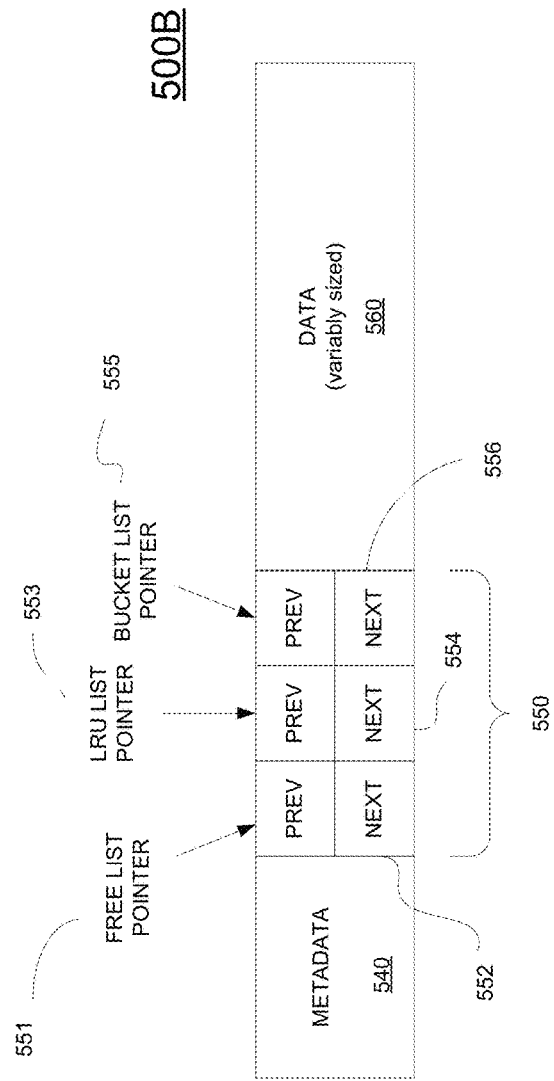

BLOB POOLS, SELECTORS, AND COMMAND SET IMPLEMENTED WITHIN A MEMORY APPLIANCE FOR ACCESSING MEMORY

CROSS REFERENCE TO RELATED APPLICATIONS

The present application claims priority to and the benefit of the commonly owned, provisional patent application, U.S. Ser. No. 61/919,318, entitled "HIGH DENSITY RACK-MOUNT MEMORY WITH PROCESSING CAPABILITY," with filing date Dec. 20, 2013, which is herein incorporated by reference in its entirety. The present application claims priority to and the benefit of the commonly owned, provisional patent application, U.S. Ser. No. 61/952,784, entitled "A MEMORY APPLIANCE SYSTEM AND ARCHITECTURE INCLUDING ONE OR MORE PROGRAMMABLE INTERFACES FOR ACCESSING MEMORY," with filing date Mar. 13, 2014, which is herein incorporated by reference in its entirety. The present application claims priority to and the benefit of the commonly owned, provisional patent application, U.S. Ser. No. 61/952,800, entitled "METHOD AND SYSTEM FOR APPLICATION AWARE ACCELERATION OF PROGRAMMABLE MEMORY INTERFACES FOR ACCESSING MEMORY IN A MEMORY APPLIANCE ARCHITECTURE," with filing date Mar. 13, 2014, which is herein incorporated by reference in its entirety. The present application claims priority to and the benefit of the commonly owned, provisional patent application, U.S. Ser. No. 61/952,798, entitled "RELIABILITY, AVAILABILITY, AND SERVICEABILITY (RAS) WITHIN A MEMORY APPLIANCE ARCHITECTURE INCLUDING ONE OR MORE PROGRAMMABLE INTERFACES FOR ACCESSING MEMORY," with filing date Mar. 13, 2014, which is herein incorporated by reference in its entirety. The present application claims priority to and the benefit of the commonly owned, provisional patent application, U.S. Ser. No. 61/952,778, entitled "REDUCING LATENCY WITHIN A MEMORY APPLIANCE ARCHITECTURE INCLUDING ONE OR MORE PROGRAMMABLE INTERFACES FOR ACCESSING MEMORY," with filing date Mar. 13, 2014, which is herein incorporated by reference in its entirety. The present application claims priority to and the benefit of the commonly owned, provisional patent application, U.S. Ser. No. 61/952,796, entitled "BLOB POOLS AND SELECTORS, LEVERAGING VERTICAL INTEGRATION, CREATING SUSTAINABLE ADVANTAGE, AND OXFORD COMMAND SET," with filing date Mar. 13, 2014, which is herein incorporated by reference in its entirety. The present application claims priority to and the benefit of the commonly owned, provisional patent application, U.S. Ser. No. 61/990,009, entitled "HIGH LEVEL INSTRUCTIONS WITH LOWER-LEVEL ASSEMBLY CODE STYLE PRIMITIVES WITHIN A MEMORY APPLIANCE ARCHITECTURE INCLUDING ONE OR MORE PROGRAMMABLE INTERFACES FOR ACCESSING MEMORY," with filing date May 7, 2014, which is herein incorporated by reference in its entirety. The present application claims priority to and the benefit of the commonly owned, provisional patent application, U.S. Ser. No. 61/990,014, entitled "MEMORY APPLIANCE ARCHITECTURE INCLUDING ONE OR MORE PROGRAMMABLE INTERFACES (E.G., FPGAS) FOR ACCESSING MEMORY," with filing date May 7, 2014, which is herein incorporated by reference in its entirety. The present application claims priority to and the benefit of the commonly owned, provisional patent application, U.S. Ser. No. 61/990,033, entitled "ARCHITECTURE OF A MEMORY PACKET INCLUDING DATA STRUCTURE AND HIERARCHY USED WITHIN A MEMORY APPLIANCE ARCHITECTURE INCLUDING ONE OR MORE PROGRAMMABLE INTERFACES FOR ACCESSING MEMORY," with filing date May 7, 2014, which is herein incorporated by reference in its entirety.

This application is related to U.S. patent application Ser. No. 14/539,641, entitled "MEMORY APPLIANCE FOR ACCESSING MEMORY," with filing date Nov. 12, 2014. This application is related to U.S. patent application Ser. No. 14/539,740, entitled "HIGH LEVEL INSTRUCTIONS WITH LOWER-LEVEL ASSEMBLY CODE STYLE PRIMITIVES WITHIN A MEMORY APPLIANCE FOR ACCESSING MEMORY," with filing date Nov. 12, 2014. The present application is related to commonly owned, U.S. patent application Ser. No. 14/539,628, entitled "MEMORY PACKET, DATA STRUCTURE AND HIERARCHY WITHIN A MEMORY APPLIANCE FOR ACCESSING MEMORY," with filing date Nov. 12, 2014, which is herein incorporated by reference in its entirety.

BACKGROUND

Increasingly, information is stored in large data storage systems. At a base level, these data storage systems are configured with multiple processors, each controlling access to corresponding memory. Each processor is configured to control a certain amount of memory. However, scaling of memory by adding processors with corresponding memory is unable to keep current with demands to increase memory capacity due to processor cost constraints and limited increases in memory per processor.

ACRONYMS, ABBREVIATIONS, & TERMS

MA—memory appliance
NPU—network processing unit
SMC—Smart Memory Cube
OCP—open compute project
FPGA—field programmable gate array
KV—key/value
AXI—Advanced eXtensible Interface
RegEx or regexp—regular expression
QoS—quality of service
FF—form factor
PDU—power distribution unit
PS—power supply
POR—plan of record
RAS—reliability, availability, and serviceability
MC—memory controller
HW or H/W—hardware
SW—software
DMA—direct memory access
CRC—cyclic redundancy check
Rd or RD—read
Wr or WR—write
FIFO—first-in first-out
PHY—physical layer
IO or I/O—input/output
ASIC—application specific integrated circuit
DIMM—dual in-line memory module
LRDIMM—load reduced DIMM
CPU—central processing unit
CA or C/A—command/address
ECC—error correcting code DDR—double data rate
Addr—address
RAM—random access memory
DRAM—dynamic random access memory
RDIMM—registered DIMM
B/W—bandwidth
OS—operating system
GPU—graphics processing unit
NVM—nonvolatile memory
SSD—solid state disk
DFS—distributed file system
IOPS—I/Os per second
PCB—printed circuit board
IP—internet protocol
NIC—network interface card
PCI—peripheral component interconnect
PCIe—peripheral component interconnect express
LRU—least recently used
OSI—Open Systems Interconnection
TCP—transmission control protocol
UDP—user datagram protocol
EEPROM—electrically erasable programmable read-only memory
DPA—differential power analysis
PCA—physical command queue
CCD—command control or copy daemon
RET—the last command in a chain
ROM—read only memory
CD-ROM—compact disc ROM
DVD—digital versatile disk
RF—radio frequency
ISA—Industry Standard Architecture
SCSI—Small Computer System Interface
USB—universal serial bus
WAN—wide area network
LAN—local area network
PAN—personal area network
NAS—network attached storage
NFS—network file system
SMB—server message block
CIFS—common internet file system
SAN—storage area network

BRIEF DESCRIPTION OF THE DRAWINGS

Further aspects of the present disclosure will become apparent from the following description which is given by way of example only and with reference to the accompanying drawings in which:

FIG. 5A is an illustration of a data packet used within a reconfigurable memory structure implemented within a memory appliance architecture including programmable memory interfaces for accessing memory, in accordance with one embodiment of the present disclosure.

FIG. 5B is an illustration of a data packet used within defined reconfigurable Memcached memory structure implemented within a memory appliance architecture including programmable memory interfaces for accessing memory, in accordance with one embodiment of the present disclosure.

DETAILED DESCRIPTION

Reference will now be made in detail to the various embodiments of the present disclosure, examples of which are illustrated in the accompanying drawings. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Memory Appliance System

Figure 1A:
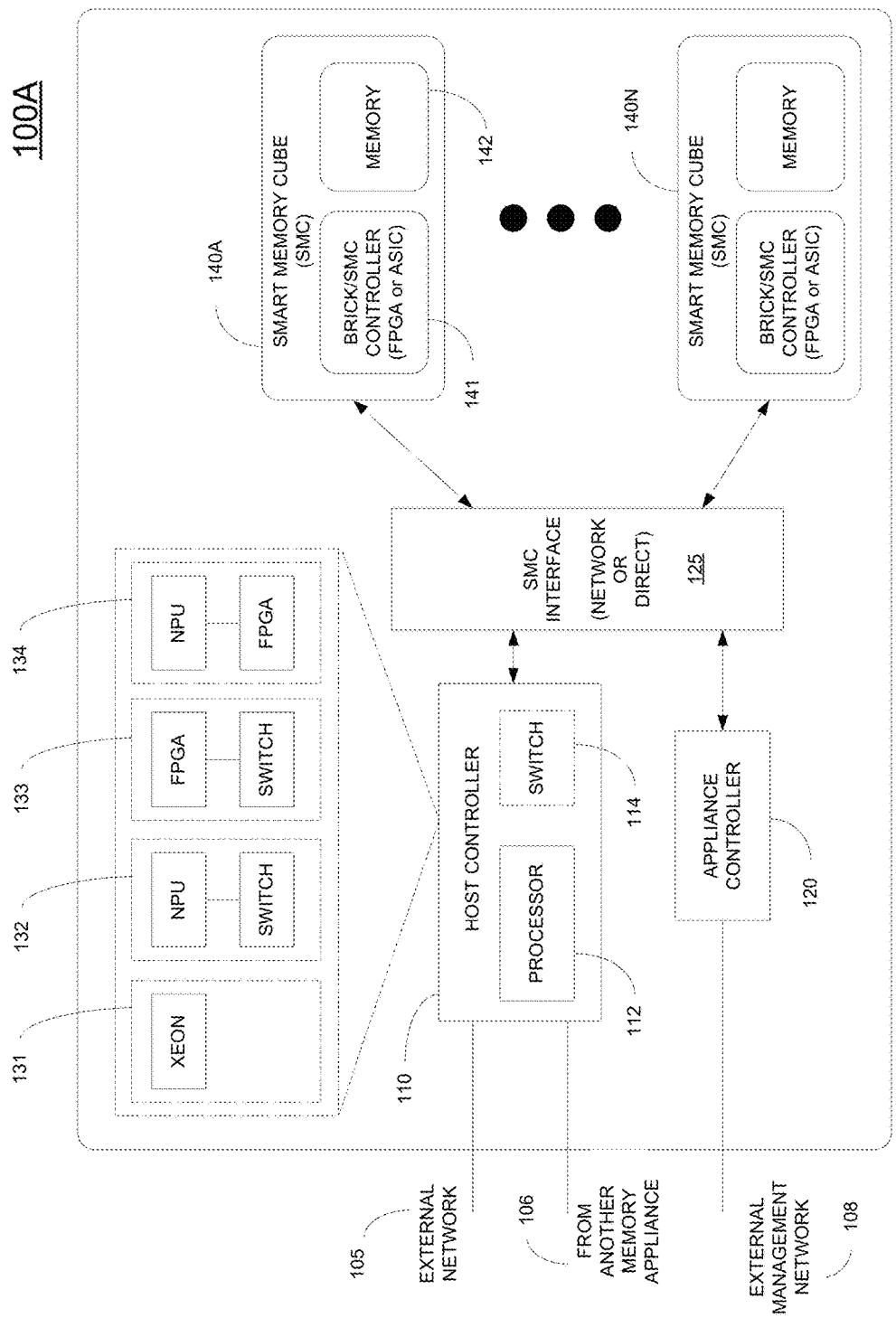
FIG. 1A is a block diagram of a memory appliance including a SMC including SMC controllers implemented as an FPGAs and/or ASIC, in accordance with one embodiment of the present disclosure.

FIG. 1A is a block diagram of a memory appliance system 100A, in accordance with one embodiment of the present disclosure. In one embodiment, the memory appliance system 100A provides for higher capacity and higher bandwidth scaling of the memory and computation offloading to the memory with the use of programmable memory interfaces. In another embodiment, the memory appliance system 100A provides for a higher rate of scaling of memory with the use of hardware implemented ASICs memory interfaces. Both the programmable and ASIC implementable memory interfaces on the memory side of an interface are configured to control and perform application specific primitive operations on memory that are typically controlled by a processor on the other side of the interface. Memory appliance system 100A is configured to receive high level command or instructions (e.g., OSI layer 7 protocol or interface command from a client system), and to translate the instructions into lower-level assembly code style primitive operations that are executable by a plurality of SMC controllers. By controlling and performing these primitive operations at the memory, data from each primitive operation need not be delivered back-and-forth over the interface, thereby greatly reducing and/or avoiding the latency buildup normally experienced with increased scaling of memory.

The memory appliance 100A includes a plurality of smart memory units or Smart Memory Cubes (SMCs) 140A-N, each of which include memory. The term "SMCs" is used throughout this disclosure for ease of reference but is not meant to impart a special definition or suggest that particular functions or aspects are required. As such, memory is distributed throughout the memory appliance 100A in the plurality of SMCs 140A-N. The memory appliance 100A can be configured as a stand-alone unit, or as a scalable unit. That is, in a scalable configuration a plurality of similarly configured memory appliances may be combined to form a non-limited and scalable configuration of memory.

In either the stand-alone or scalable configurations, an appliance controller 120 is coupled to the plurality of SMCs 140A-N through a command interface in order to provide configuration information for memory contained within the SMCs 140A-N. The appliance controller 120 may be coupled to higher level controller that remotely manages one or more memory appliances through an external management network 108. For example, operations performed by the appliance controller 120 alone or in cooperation with a remote manager include discovery of memory, provision of memory (e.g., within a virtual memory device), event logging, remote management, power and/or thermal management, monitor, and control.

As shown in FIG. 1A, the memory appliance system includes a host controller 110 that is configured to perform processing and switching operations. More particularly, host controller 110 manages memory distributed throughout the plurality of SMCs 140A-N in the memory appliance system 100A. Additionally, the host controller 110 is operable to be coupled to one or more communication channels with a command interface, wherein the communication channels are coupled over an interface 125 to memory. Also some form of notification (e.g., pointers to memory) or results is also delivered through the interface 125 back to the host controller 110.

The host controller 110 includes a processor 112 and an optional switch 114, in one implementation. The processor 112 generates and communicates commands over the one or more communication channels, wherein the commands are configured for accessing memory distributed throughout a plurality of SMCs. For example, the processor 112 is configured to receive high level commands (e.g., from a client side database application implementing Memcached) and translate those commands to a series of primitive commands that are operable within each of the SMCs for accessing and/or operating on data stored in memory. In addition, the switch 114 is configurable to deliver a corresponding command or series of commands to the proper SMC for accessing and/or performing operations on memory.

The processor 112 in the host controller 110 is configured to receive and send communications over an external network 105. In one example, the external network provides an interface with a client device. In another example, an external network 106 is configured provide communications between memory appliances. In one embodiment, the external networks 105 and 106 are similarly configured. In one embodiment, the processor 112 is coupled to a NIC to provide access to the external network. In another embodiment, the processor 112 is configured as a NPU that includes an internal communication interface for communicating with the external network. In still another embodiment, the processor 112 is configured as an FPGA.

Various configurations are supported for the host controller. For illustration purposes only, as shown in FIG. 1A, a first configuration 131 includes a CPU (e.g., an Intel XEON® processor); a second configuration 132 includes an NPU configured for performing processing operations, and a switch for performing switching operations; a third configuration 133 includes an FPGA configured for performing processing operations, and a switch for performing switching operations; and a fourth configuration 134 includes an NPU configured for performing processing operations, and an FPGA configured for performing switching operations. Other configurations are supported, such as an Intel XEON® processor and a switch for performing switching operations.

Figure 1B:
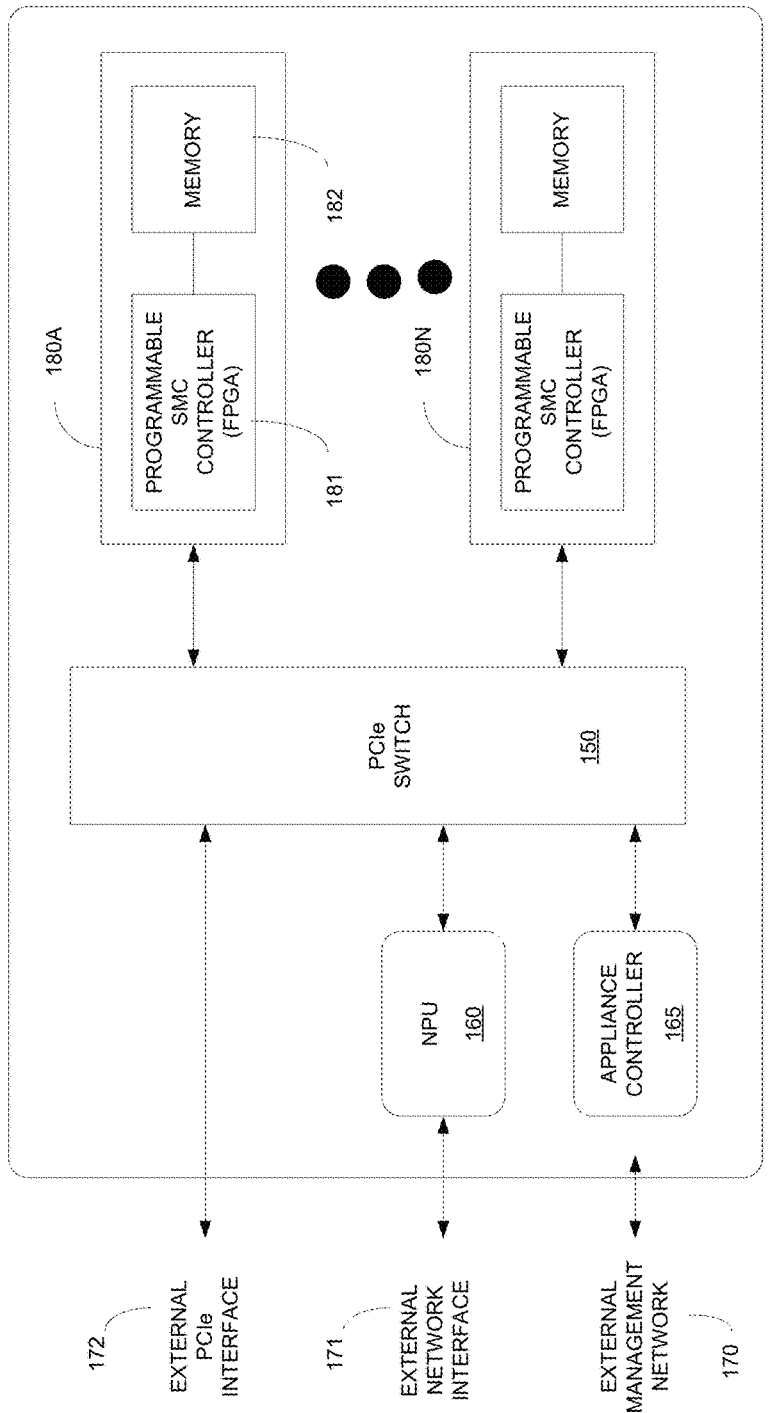
FIG. 1B is a block diagram of a memory appliance including a NPU as a host controller that communicates with a plurality of SMCs over a PCIe interface, in accordance with one embodiment of the present disclosure.

A specific configuration including an NPU as a host controller is further described in FIG. 1B, in accordance with one embodiment of the present disclosure. Specifically, the memory appliance 100B includes a plurality of SMCs 180A-N, each of which include memory. An appliance controller 165 is coupled to the plurality of SMCs 180A-N through an interface that is a PCIe switch 150 to provide configuration information to the memory. In one implementation, the appliance controller 165 is coupled to a higher level controller through the external management network 170 for remote management. In addition, the memory appliance system 100B includes a host controller that is an NPU 160, and is configured for managing memory distributed throughout the plurality of SMCs 180A-N. Each of the SMCs includes a programmable SMC controller (e.g., FPGA) 181 and memory 182. Communication between the NPU 160 and the plurality of SMCs 180A-N is achieved through the PCIe switch 150. As such, commands generated by the NPU 160 and configured to access and operate on memory in the SMCs 180A-N is delivered through the PCIe switch 150 for operation by the corresponding programmable SCM controller. Also some form of notification or results is also delivered through the PCIe switch 150 back to the NPU 160.

Returning to FIG. 1A, as previously presented, the processor 112 is configured to manage memory throughout the plurality of SMCs in the memory appliance system when performing host controller duties. For example, the processor 112 in the host controller 110 is configured to provide memory services, such as, load balancing, quality of service, connection management, and traffic routing. Further, in one embodiment, the host controller 110 manages memory in the memory appliance system as a virtual memory system.

The plurality of SMCs 140A-N is coupled to the processor 112 through one or more communication channels established through a command interface 125, also referred to as the SMC interface 125. In that manner, commands generated by or passed through the processor 112 are delivered to the plurality of SMCs 140A-N through the command interface 125.

In one embodiment, the communication channels in the command interface 125 comprises a network interface for providing communication between the host controller 110 and the plurality of SMCs 140A-N. That is, communication between the processor and the plurality of SMCs is accomplished using networking protocols. For instance, the network interface may be configured using one of the following protocols: a TCP; a UDP; Ethernet; Infiniband; Fiber Channel, and other networking protocols.

In another embodiment, the communication channels in the command interface 125 comprise a direct interface. That is, the processor 112 and each of the plurality of SMCs communicate over a point-to-point communication channel or link between two ports. For example, the link may establish a point-to-point communication using the PCIe interface, or one of its derivatives, that is a high-speed serial computer expansion bus standard.

Each SMC includes a brick or unit controller (also referred to as the SMC controller) that is hardwired or programmable to execute application specific commands and/or operations generated by an external client and/or application. For illustration, SMC 140A, including its components, is representative of each of the plurality of SMCs 140A-N. For example, SMC controller 141 is configured to perform data operations on the content that is included in memory 142. In one embodiment, the data operations are performed transparently to the command interface and/or requesting client (communicatively coupled through the external network 105). For example, data operations include search, sort, and other custom accelerations.

In one embodiment, the SMC controller 141 in SMC 140A is configured as a FPGA that is pre-programmed with the proper functionality to handle a requested command. In another embodiment, the FPGA is programmed on-the-fly depending on the request made on the memory 142 contained within SMC 140A. For example, the FPGA is configured to generate and compile primitive operations when receiving one or more high level commands, wherein the primitive operations are executable by the FPGA. In another embodiment, the FPGA is configured to access configuration files for programming with the proper functionality. In still another embodiment, the SMC controller 141 is implemented through an ASIC device providing application specific operations.

In embodiments, the SMC controller 141 is configured to respond to primitive commands delivered over the command/SMC interface 125 to access and/or perform operations on content stored in memory 142. More specifically, processor 112 is configured to receive high level commands over the external network 105 (e.g., from a client application) and translate each of the commands to one or more primitive operations. The primitive operations are delivered over the command/SMC interface 125 for handling by the SMC controller 141. In that manner, by handling these primitive operations at the memory, the step by step control of the primitive operations associated with a particular high level command need not be controlled by processor 112, thereby reducing and/or avoiding any latency due to increased scaling of memory in the plurality of SMCs 140A-N.

For example, the plurality of memory devices in memory appliance 100A may be configured as a Memcached memory system that is a general-purpose distributed memory caching system. As such, the primitive commands are designed to implement access and manipulation of data within the Memcached memory system. In particular, access to memory in the Memcached memory system is performed using a key value pair or key value functions as implemented through the primitive operations. For example, using one or more primitive operations, a key within a command is hashed using the appropriate algorithm in order to determine proper addressing within the memory. Typical key value commands/functions include "GET", "SET" and "DELETE" operations that are each further translated into one or more primitive operations handled by the corresponding SMC.

Further, in one embodiment the SMC controller 141 in SMC 140A is configured to respond to high level commands delivered over the command/SMC interface 125 to access and/or perform operations on content stored in memory 142. That is, the SMC controller 141 can be configured to translate the high level commands into a format suitable for use within the SMC controller 141 when interfacing with memory 142. That is, instead of performing translation at processor 112, the translation of high level commands into primitive operations suitable for use within the SMC controller 141 is performed locally.

In one embodiment, SMC controller 141 is configured to provide custom acceleration of data operations. Some examples of custom accelerations include, but are not limited to, error recovery, data manipulation, and data compression. For example, SMC controller 141 may be configured to handle one or more application specific operations (e.g., Memcached search operation). In one embodiment, SMC controller 141 is programmable such as through an FPGA to handle a specific operation. In another embodiment, SMC controller 141 is programmed on-the-fly to handle an incoming operation. In still another embodiment, SMC controller is implemented through an ASIC that is configured to handle one or more application specific operations.

Further, the SMC controller 141 may include an additional processor for handling less time sensitive functions, such as, management and control of the memory devices. For instance, instructions coming from the appliance controller 120 are handled by this additional processor.

In addition, each SMC includes a plurality of memory devices. For example, SMC 140A includes memory 142. In one embodiment, the plurality of memory devices in a corresponding SMC includes memory devices packaged in a DIMM, registered memory module (RDIMM), and/or load reduced memory (LRDIMM). In one further embodiment, the memory devices packaged in a corresponding DIMM include DRAM memory devices. In still another embodiment, the memory devices packaged in a corresponding DIMM include non-volatile memory devices (e.g., Flash, EEPROM).

In one embodiment, each SMC is configured with multiple channels (e.g., four), each of which is suitable for handling multiple DIMMs (e.g., six). In an example, SMC 140A is able to handle up to and more than twenty-four DIMMs given four channels, and six DIMMs per channel. As demonstrated, embodiments of the present disclosure provide for a larger amount of DIMMs per SMC for increased scalability.

Figure 2:
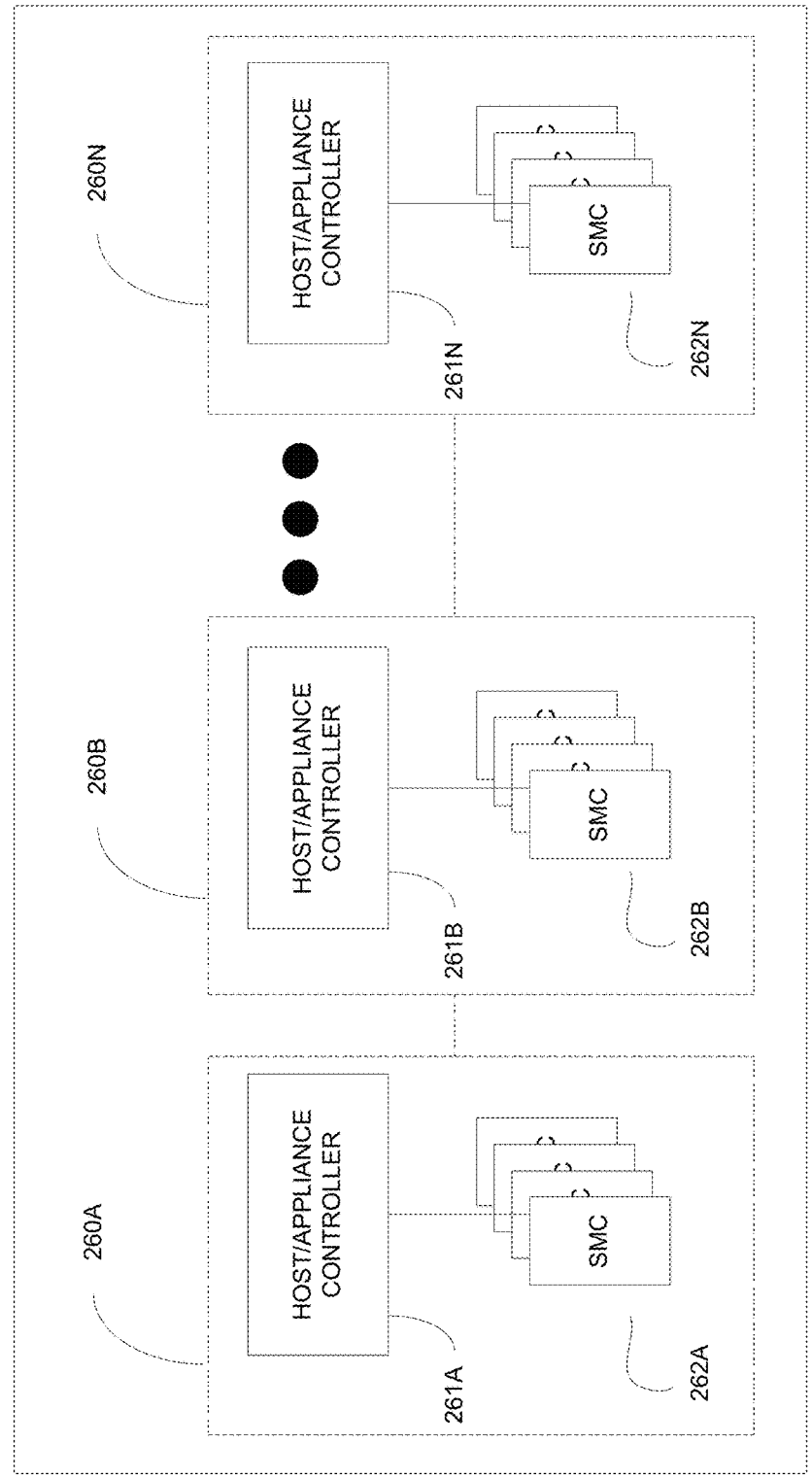
FIG. 2 is a block diagram of a plurality of memory appliances, in accordance with one embodiment of the present disclosure.

FIG. 2 is a block diagram of a memory system 200 including plurality of memory appliances 260A-N, in accordance with one embodiment of the present disclosure. The plurality of memory appliances 260A-N provide access to internal memory devices. That is, each of the memory appliances 260A-N provides access to corresponding memory. In particular, the plurality of memory appliances 260A-N includes a first memory appliance system (e.g., 260A) and at least one other, or second, memory appliance system (e.g., 260B). Both memory appliance systems are similarly configured, such as, that described in FIGS. 1A-B. For example, each of the memory appliance systems includes a host controller for managing data across a corresponding plurality of SMCs.

For illustration, memory appliance 260A provides access to memory 262A through host controller 261A, wherein memory 262A includes one or more SMCs; memory appliance 260B provides access to memory 262B through host controller 261B, wherein memory 262B includes one or more SMCs; and memory appliance 260N provides access to memory 262N through host controller 261N, wherein memory 262N includes one or more SMCs. In one embodiment, the memory devices are configured as virtual memory, wherein distributed memory devices are accessible by each of the host controllers of the plurality of memory appliances.

In one embodiment, the host controllers of the plurality of memory appliances 260A-N are in communication to facilitate a distributed memory system 200. For example, an external communication interface is configured to provide communication between host controllers within the plurality of memory appliances 260A-N to provide access to memory virtualized across one or more memory appliance systems. The communication interface can include a fat pipe configured as a higher speed and higher bandwidth communications channel for communicating data, and a skinny pipe as a lower speed and lower bandwidth communications channel configured for communicating instructions/control.

Figure 3:
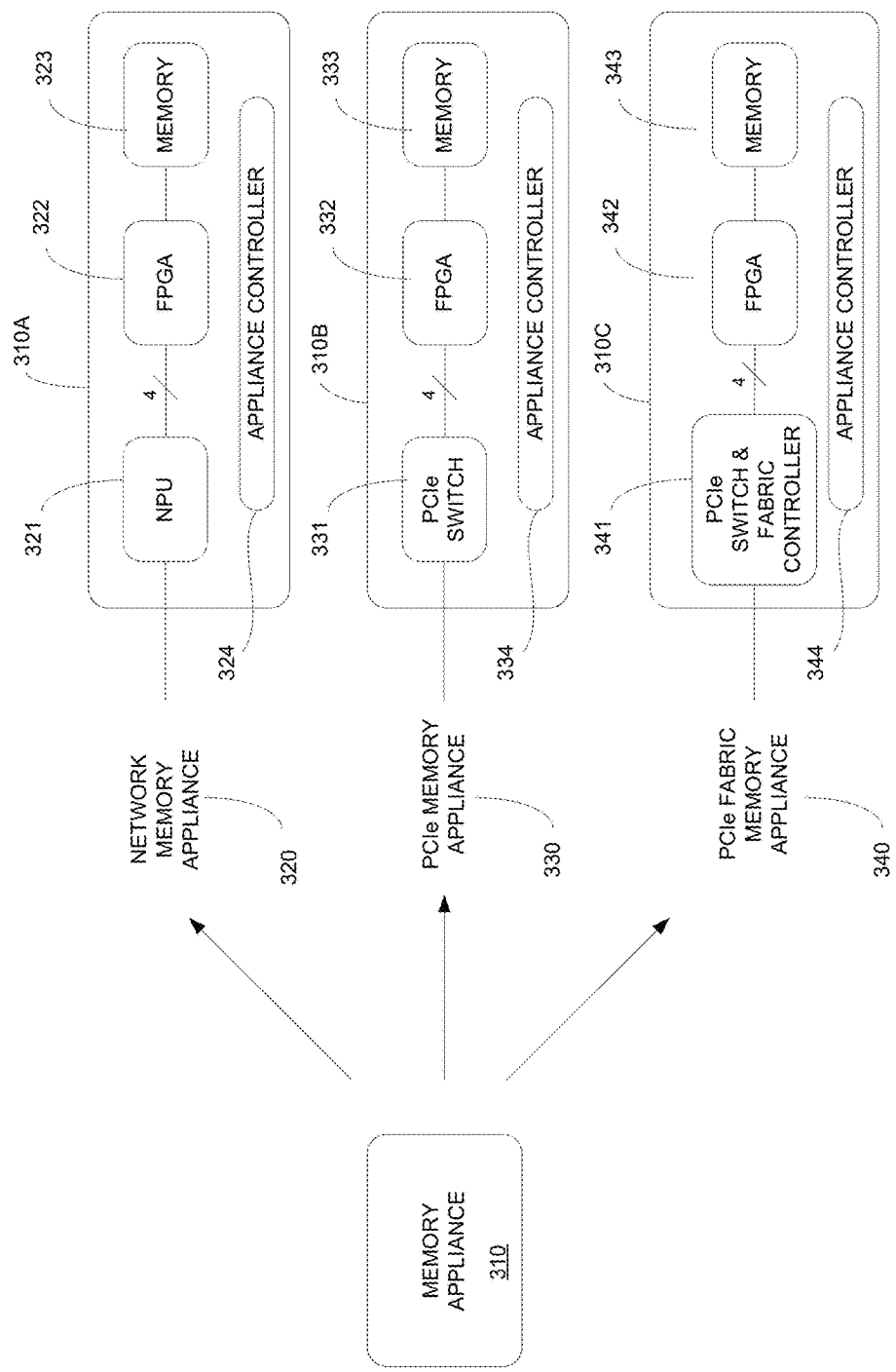
FIG. 3 is an illustration of various implementations of a memory appliance interface, in accordance with one embodiment of the present disclosure.

FIG. 3 is an illustration of various implementations of a memory appliance command interface within a memory appliance system 310, wherein the interface is established to facilitate communication between a host controller and one or more SMCs within a memory appliance 310, in accordance with one embodiment of the present disclosure. These examples are provided for illustration only as various other implementations of a memory appliance interface are supported.

In the first example, the memory appliance system 310 is implemented as a network based memory appliance system 310A. For instance, the memory appliance system 310A is supported by a network interface, and includes a NPU 321 that is coupled to one or more SMCs (e.g., four as shown in FIG. 3), wherein each SMC includes a programmable FPGA 322 and memory 323, as previously described. For example, NPU 321 is coupled to a host controller via a network interface in order to pass commands and data. That is, the network interface relies on network addresses identifying the network nodes of the host controller and the network based memory appliance system 310A to deliver communications.

In the second example, the memory appliance system 310 is implemented as a PCIe memory appliance system 310B, wherein the PCIe provides a direct interface between the PCIe switch 331 of the host controller and the one or more SMCs (e.g., four as shown in FIG. 3). Each of the SMCs includes a programmable FPGA 332 and memory 333. For example, PCIe switch 331 is coupled to a host controller via a direct interface (e.g., PCIe) in order to pass commands and data. PCIe devices communicate via a point-to-point connection or interconnect, wherein a direct channel is established between two PCIe ports of computing device allowing both to send/receive ordinary PCIe requests and interrupts.

In the third example, the memory appliance system 310 is implemented as a PCIe fabric memory appliance system 310C. For instance, the memory appliance system 310C is supported by a PCIe fabric providing a direct interface between the PCIe switch and fabric controller 341 and one or more SMCs (e.g., four as shown in FIG. 3). Each of the SMCs in the memory appliance system 310C includes an FPGA 342 and memory 343. For example, a PCIe-based fabric enables straightforward sharing of I/O devices at low cost and utilizing a low power envelope. Direct coupling of the host controller to the PCIe fabric, and then to memory does not require other intermediary devices, as in an Infiniband network. For example, the PCIe fabric controller 341 is coupled to a host controller via a direct interface through a PCIe-based network fabric in order to pass commands and data. The PCIe based fabric is used as a unified fabric to replace traditional communication interconnects (e.g., replace small Infiniband clusters) to achieve high-speed clustering.

High Level Instructions Translated to Lower-Level Assembly Code Style Primitives within a Memory Appliance Architecture Embodiments of the present disclosure provide for a memory appliance that includes a processor and a plurality of SMCs, wherein each SMC includes a plurality of memory devices, and an SMC controller for independently controlling the management of one or more groupings of memory within a plurality of memory devices of a corresponding SMC. The memory appliance is configured to receive high level instructions from a client system (e.g., OSI layer 7 protocol or interface commands), and to translate the instructions into lower-level assembly code style primitive operations that are executable by the plurality of SMC controllers. That is, high-level, application layer commands are translated to primitive operations (e.g., low level operations corresponding to machine code instructions) for execution by the corresponding computing device (e.g., SMC controller).

The methods and systems disclosing the translation of high level instructions to lower-level primitive operations in embodiments of the present disclosure are implementable within the systems and flow diagrams described in FIGS. 1-3. For example, the memory appliance systems 100A-B of FIGS. 1A-B are configured to receive high level instructions from a client system and translate those instructions into lower-level primitive operations that are formatted for execution by a plurality of SMC controllers each configured to manage corresponding memory devices.

Figure 4:
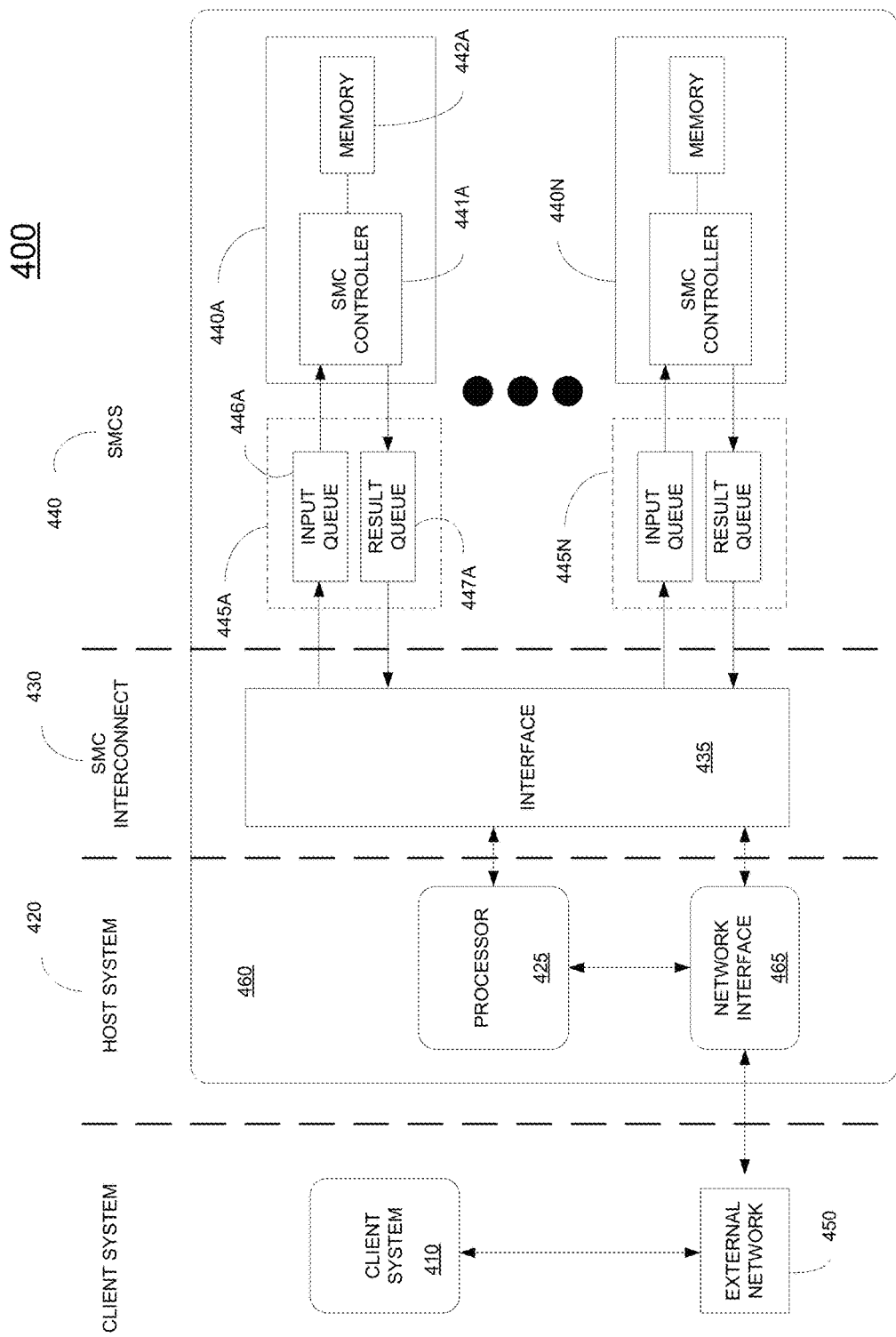
FIG. 4 is a block diagram of a system including a client system communicatively coupled with a memory appliance, wherein the memory appliance is configured to translate high level instructions into lower-level assembly code style primitive operations that are executable by a plurality of SMC controllers implemented as FGPAs or ASICs, in accordance with one embodiment of the present disclosure.

FIG. 4 is a block diagram of a system including a client system 415 that is communicatively coupled with a memory appliance 460, wherein the memory appliance 460 is configured to translate high level instructions into lower-level assembly code style primitive operations that are executable by a plurality of SMC controllers implemented as FPGAs and/or ASICs, in accordance with one embodiment of the present disclosure. The memory appliance system provides for a higher rate of scaling of memory within the memory appliance having the SMC controller manage the execution of the primitive operations.

As shown in FIG. 4, memory system 400 includes a client system 410 and a memory appliance system 460, wherein the memory appliance system can be further partitioned into a host system 420, an SMC interconnect/interface 430, and a plurality of SMCs 440. The client system 410 is communicatively coupled with the memory appliance system 460 over an external network 450. For example, the external network 450 allows two different computing systems to communicate using a communication protocol.

In particular, client system 410 provides an interface to the memory appliance system 460. The host system relays client side requests and commands used for accessing data stored within the memory appliance system. In particular, client system 410 is configured to deliver a high level command/instruction to the memory appliance system 460 for execution. For example, the command may be implemented within the highest layer of the OSI model—application layer 7. That is, the command is formatted as a protocol or interface used for computer systems across a communication network. Though one memory appliance system 460 is shown coupled to the client system 410, it is understood that client system 410 may be coupled to one or more memory appliances providing distributed memory storage.

For illustration purposes only, client system 410 may be a database system, managed by a social networking company, storing data about its members in distributed memory, and is accessing data contained within the memory appliance system 460. In the example, client system 410 may be accessing and managing data stored within the memory appliance 460 using high level commands. As an example, the memory appliance 460 may be structured as a Memcached memory system, wherein the client system 410 accesses data using Memcached application layer instructions. In another illustration, the client system 410 may be a computing resource associated with a user, wherein the computing resource is used for accessing information across an external network 450 that is stored on the memory appliance 460.

As shown, the host system 420 of the memory appliance system 460 includes a processor 425 and a communications or network interface 465. The network interface 465 communicatively couples the memory appliance system 460 to the external network 450, such that client system 410 is able to communicate with memory appliance system 460 using a communication protocol. In one implementation, the network interface 465 can be a NIC. In another implementation, the network interface 465 is internal to an NPU. For instance, client system 410 delivers a high level command through the external network 450 to the NIC 465.

Processor 425 is configured as a host controller that manages a plurality of memory devices distributed throughout a plurality of SMCs, as previously described. For example, processor 425 is able to provide memory services, such as, load balancing, quality of service, connection management, and traffic routing.

As shown, processor 425 is configured to receive a high level command originating from the client system 410 via the NIC 465, and translate the high level command into application specific primitive commands or operations that are formatted by execution by the plurality of SMCs 440. For example, the high level command may be structured to access memory in a Memcached distributed memory caching database using a key value pair or key-value functions to access memory. For example, a key within a command is hashed using the appropriate algorithm in order to determine proper addressing within the memory. Typical key value functions include "GET", "SET" and "DELETE" operations.

Further, the high level command is translated by processor 425 into one or more primitive operations executable by the SMCs to access memory. For instance, the primitive operations are at the level of assembly code, and are function or application specific (e.g., search, sort, and other custom accelerations, such as, error recovery, data manipulation, data compression). In the example of a Memcached database, the primitive operations are tailored for accessing data, and/or may be tailored for performing a specific operation (e.g., search, write, etc.) to memory in the Memcached database.

Processor 425 is coupled to one or more communication channels over the SMC interconnect 430. For instance, interconnect 430 is a command interface 435 that allows for the primitive operations to be delivered from the processor 425 to the plurality of SMCs 440 over one or more communication channels, wherein the primitive operations are configured for accessing memory distributed throughout the SMCs. In one implementation, interface 435 includes communication channels configured as a network interface (e.g., TCP, UDP, Ethernet, Infiniband, etc.) using a network protocol. In another implementation, interface 435 includes communication channels configured as a direct interface (e.g., PCI, PCIe, XAUI, QuickPath, Infiniband, Serial Rapid IO (SRIO), 1/10/40/100 Gigabit Ethernet, Interlaken, FiberChannel, FiberChannel over Ethernet (FCoE), SAS, iSCSI, SATA, other protocols using Ethernet as an underlying layer, etc.) that provides for communication over a point-to-point communication channel/link/connection between two ports.

In one embodiment, the primitive operations and results are delivered to optional queue combinations 445A-N, wherein each queue combination is associated with a selected SMC. Each queue combination includes at least one input queue and at least one result queue. Each of the individual queues may be located on either side of interface 435, such that they may be co-located on one side, or separately located on opposite sides of interface 435. For example, queue combination 445A is associated with SMC 440A, and includes input queue 446A and result queue 447A. In that manner, primitive operations are asynchronously executed by the plurality of SMCs 440.

Further, each of the plurality of SMCs 440 includes an SMC controller and a plurality of memory devices. The SMC controller includes an interface for managing data or memory throughout corresponding memory devices. For example, the interface may be used to accelerate functions performed on a corresponding memory or memories. For example, SMC 440A includes SMC controller 441A and memory devices 442A. An SMC controller may be programmable (e.g., FPGA) or statically configured (e.g., ASIC) to execute application specific commands and/or operations generated by an external client and/or application.

As shown in FIG. 4, input queue 446A is configured to receive a plurality of primitive operations from processor 425 and deliver those primitive operations to the SMC controller 441A for execution on memory devices included in memory 442A. The primitive operations are translated from a high level command that is directed to memory on SMC 440A, and executed by SMC controller 441A. A result of the primitive operations is delivered to the result queue 447A for access by processor 425 or delivery to processor 425. In one embodiment, the result comprises a pointer to a memory location, wherein the data stored in that memory location satisfies the query associated with the high level command and/or plurality of primitive operations.

Further, in one embodiment the processor is notified of the result, and initiates a direct memory transfer (e.g., DMA) of the data stored in the memory location with the network interface 465 using the pointer. That is, once the direct memory transfer is initiated by processor 425, and the pointer is delivered to the network interface 465, the processor 425 no longer controls the transfer of data across the external network 450. In that manner, redundant and unnecessary copies of the data are not made within the local memory associated with the processor 425. For example, a direct memory transfer may be initiated as a DMA operation, wherein a DMA controller (not shown) monitors and/or controls the movement of data from memory 442A across the external network 450 via network interface 465 to the client system 410. In that case, the DMA controller may send an interrupt to the processor indicating that the data has been delivered across the external network 450.

Memory Packet, Data Structure and Hierarchy within a Memory Appliance Architecture Embodiments of the present disclosure provide for reconfigurable memory structure implemented within a memory appliance architecture including programmable memory interfaces for accessing memory. Implementation of the memory structure is achieved through a content-aware memory controller which comprehends logical data structure and not memory raw bits. The reconfigurable memory structure in embodiments of the present disclosure is implementable within the systems and flow diagrams described in FIGS. 1-4. For example, the memory appliance systems 100A-B and 400 of FIGS. 1A-B and 4 are configured to receive high level instructions from a client system and translate those instructions into lower-level primitive operations that are formatted for execution by a plurality of SMC controllers on the reconfigurable memory structure, wherein each SMC controller is configured to manage corresponding memory devices.

Embodiments of the present disclosure provide for a memory appliance that includes a processor and a plurality of SMCs, wherein each SMC includes a plurality of memory devices, and an SMC controller for independently controlling the management of one or more groupings of memory within a plurality of memory devices of a corresponding SMC. The memory appliance is configured to receive high level instructions from a client system, and to translate the instructions into lower-level assembly code style primitive operations that are executable by the plurality of SMC controllers on the reconfigurable memory structure to produce a result. In particular, each of one or more SMCs includes a hardware based memory controller and memory. The memory controller may be programmable (e.g., FPGA) or include static functionality (e.g., ASIC) to controller the management of a plurality of memory devices contained in the memory. The primitive commands include data manipulation instructions formatted for operation on the items of data accessed by the SMC controller through one or more data structures stored in the device memory. In particular, the set of data structures are configurable to be comprehended by the SMC controller, upon which various primitive operations can be performed. That is, the controller is configured to respond to primitive commands configured to access content stored in one or more of the plurality of memory devices, and to perform data operations on content accessed from the plurality of memory devices. For example, the data structure organizes chunks of memory into discontinuous "collections" that are comprehended and operable by the SMC controller.

The memory controller is data structure aware such that the controller is configured to traverse the memory structure and perform operations on the memory structure based on metadata and relationship information. Specifically, the content-aware memory controller comprehends the logical data structure rather than the raw bits without taking the logical data structure into account. In particular, the command-set of primitive operations is configured to expose a set of functionality, higher-level than simple loads and stores, upon which much more sophisticated functionality is built. For example, the memory structure includes variably sized containers that are arranged in relational configurations. In one embodiment, the relationship is defined by lists, which provide a building block for many other data structures and functionality (e.g., heap managers, queues, trees, graphs, etc.). In one embodiment, an SMC controller is data structure aware by traversing across related containers in a list by accessing metadata and relationship information associated with a first container in the list, wherein the containers are stored in at least memory devices coupled to the SMC controller in one embodiment, and in another embodiment, wherein the containers are stored in memory devices coupled to one or more SMC controllers. As such, supporting basic list operations can offer a basic capability onto which richer applications are built. For instance, a primitive command as executed by the controller is configured to perform a management operation on the plurality of containers defined within the memory structure. For example, a management operation may include adding a list, modifying a list, deleting a list, etc. In another instance, a primitive command is configured to perform on raw memory within the memory structure. In still another instance, the primitive command is configured to perform a management operation on the relationship information.

FIG. 5A is an illustration of a data packet or container 500A used within a reconfigurable memory structure implemented within a memory appliance architecture including programmable memory interfaces for accessing memory, in accordance with one embodiment of the present disclosure. The container 500A includes data. As shown, the container 500A is configurable to be comprehended by a corresponding SMC controller, upon which various primitive operations can be performed, in accordance with one embodiment of the present disclosure. Container 500A is stored in device memory of the memory appliance, previously described (e.g., memory appliances 100A-B, 200, 310, and 460 of FIGS. 1A-B and 2-4), wherein the reconfigurable memory structure comprises multiple and variably sized containers. That is, within a reconfigurable memory structure, containers 500A are variably sized, such that one container may be of a different size than another container. As shown, the data packet 500A includes a payload 530 of data (variably sized), metadata 510, and relationship information 520 (variably sized).

Metadata 510 includes information specific to container 500A, wherein metadata 510 is a fixed portion of container 500A. For example, metadata 510 includes information, such as: total_length or length of the container; list_count illustrating the number of lists the container is a member of; data_length illustrating the length of the data portion; access_time indicating when the container was last accessed; create-time indicating when the container was created; reference_count; flags; etc.

Relationship information 520 provides information that associates a corresponding container 500A with one or more other containers that are stored in the memory structure. In that manner, the relationship information in a plurality of containers defines the memory structure. The memory structure is reconfigurable since any change in the relationship information in any of the containers will affect and change the overall memory structure. The relationship information allows the controller to traverse the memory structure.

The payload 530 contains data specific to the container 500A. Because the length of the data can be defined, the memory structure includes a plurality of variably sized containers. As such, a first container may include data of a first length, while a second container may include data of a second length.

In one embodiment, memory management revolves around the concepts of "blobs" as containers, and "lists" providing relationship information. A "blob" is a fixed-size chunk of device memory that carries with it certain metadata (e.g., last access time, creation time, etc.) as well as a variable array of "list entries" which facilitate its membership in one or more "lists". Lists are traditional singly or doubly linked lists of blobs. In particular, the SMC controller is configured to walk and modify lists in a thread-safe way in response to the invocation by the processor of various list primitives.

Each blob contains an array of "listentries" which represent a given blob's membership in various lists. Those lists may include additional blobs. Further, a blob can exist in multiple lists simultaneously. SMC controllers comprehending the list and blob structures, can link, unlink, prepend or append as well as search and find items within a list based on very rudimentary selection criteria.

The SMC controller will expose a set of list, blob, and raw memory primitives that can be invoked by enqueing a command block (command+parameters) to a queue. In addition to enqueing individual commands, command-chains can be enqueued. Command-chains are variable length arrays of command blocks for which the output of each command is passed to the subsequent command as a parameter. Command-chains facilitate the design goal of minimizing round-trips and queuing latency by allowing compound operations to be constructed and performed with a single command/response round trip to the SMC controller.

In one embodiment, various primitive operations will increment and decrement reference counts associated with each blob. Some primitive operations are only valid for unreferenced blobs (e.g., free) advertisement may logically "succeed" but are only committed once the reference count goes to "0". The specific case for this behavior is when a blob is in use for I/O but has been freed by the user-mode application. When the I/O completes and the reference count goes to zero, then the blob can only be added back to the free list.

FIG. 5B is an illustration of a data packet and/or container 500B used within a reconfigurable Memcached memory structure implemented within a memory appliance architecture including programmable memory interfaces for accessing memory, in accordance with one embodiment of the present disclosure. Container 500B is a specific implementation of the generic container 500A shown in FIG. 5A, wherein container 500B is implemented within a Memcached memory structure. As shown, the container 500B is configurable to be comprehended by a corresponding SMC controller, upon which various primitive operations can be performed, in accordance with one embodiment of the present disclosure. Container 500B is stored in device memory of the memory appliance, previously described (e.g., memory appliances 100A-B, 200, 310, and 460 of FIGS. 1A-B and 2-4), wherein the reconfigurable memory structure comprises multiple and variably sized containers. In particular, container 500B includes metadata 540, relationship information 550, and a payload 560 containing data.

In the example of a blob container (for example as implemented within a Memcached memory structure), a blob is a contiguous memory region (e.g., allocated from a heap). A memory slab is a collection of blobs of equal size.

As such, the reconfigurable memory structure includes containers (e.g., blobs) that are part of one or more lists, which is defined in the relationship information. That is, the relationship information 550 may include one or more list entries, which provide membership of the data in the payload into one or more lists, and/or a link or pointer to the data. For example, a listentry exposes an item of data in a corresponding list. Free, LRU, and hash bucket are examples of lists. Container 500B may be part of a classification of containers, which is defined by a free list. The free list pointer 551 points to a previous container in the same classification. The free list pointer 552 points to the next container in the same classification. The LRU pointer 553 points to the previous container in the LRU list, and LRU pointer 554 points to the next container in the LRU list. The bucket list pointer 555 points to the previous entry in a bucket list, such as one defining the first container in a list of related containers. The bucket list pointer 556 points to the next entry in the bucket list.

Figure 6:
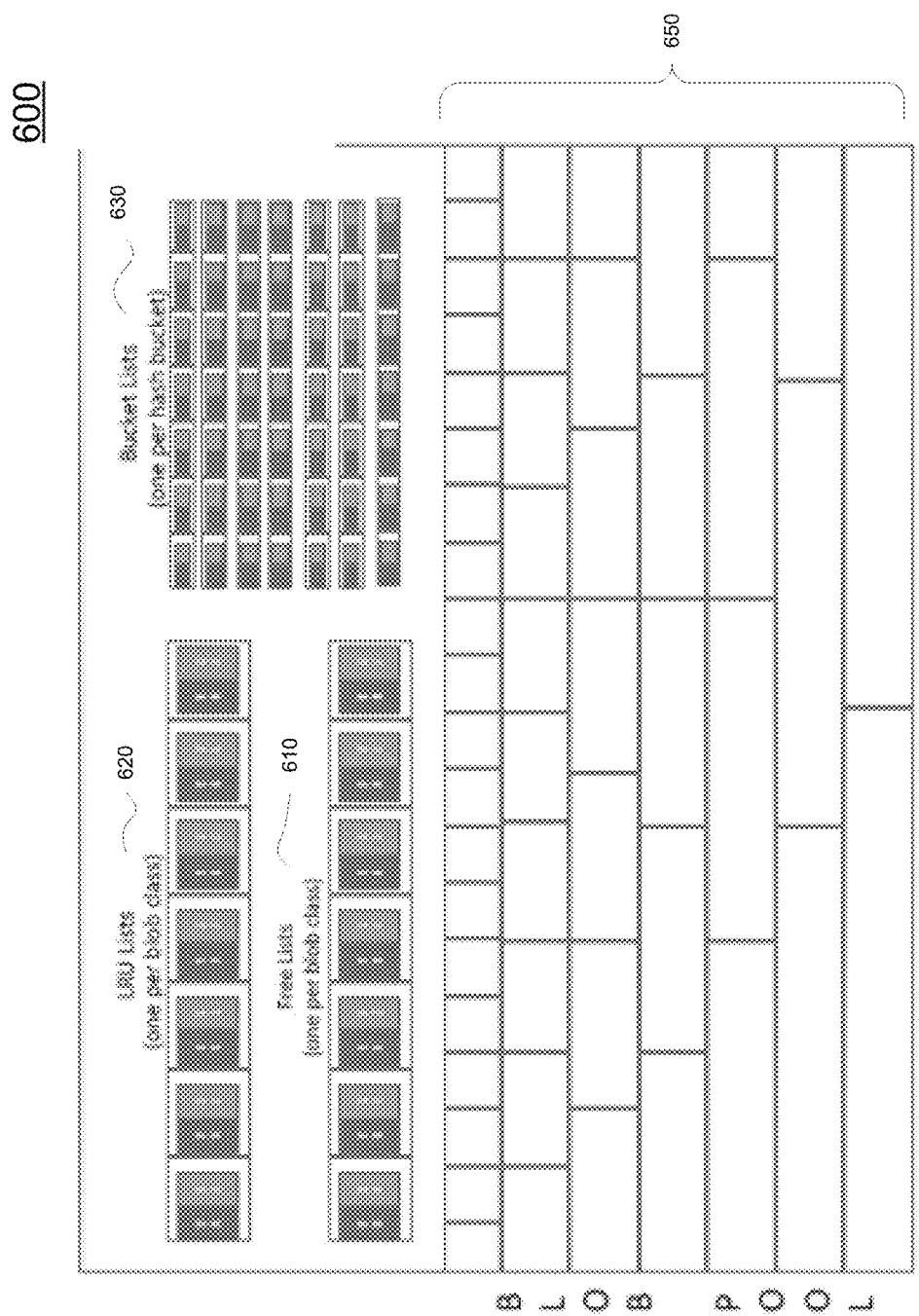
FIG. 6 is an illustration of a reconfigurable Memcached memory structure, in accordance with one embodiment of the present disclosure.

FIG. 6 is an illustration of a reconfigurable Memcached memory structure 600, in accordance with one embodiment of the present disclosure. The widespread use of distributed key/value stores as a way to exploit large pools of network attached memory makes Memcached suitable for implementation in the reconfigurable memory structure. The Memcached memory structure provides for a network-based service for storing and retrieving values associated with text-based keys, wherein keys can be up to 250 bytes in length, and their associated values can be up to 1 megabyte, in one implementation. For example, the Memcached memory structure 600 may include a plurality of containers described in FIGS. 5A-B, wherein the each container includes relationship information relating a corresponding container to other containers. In addition, the containers and/or data included within the Memecached memory structure 600 may be manipulated by the memory appliances 100A-B, memory system 200, memory appliance 310, and memory appliance 460 of FIGS. 1A-B and 2-4.

In particular, FIG. 6 illustrates how the data for a Memcached implementation might be organized on top of the kind of command primitives using data structures previously described (e.g., such as data structures managed by memory appliances of FIGS. 1A-B and 2-4), wherein Memcached provides a network-based service for storing and retrieving values associated with text-based keys, in accordance with one embodiment of the present disclosure. On startup, an implementation of Memcached would compute a sea of pointers representing addresses in device memory that reflect the division of memory into smaller pools of varying sized objects along with space reserved for the list arrays needed for the requisite Memcached functionality.

Objects in Memcached exist in one and sometimes two lists. These objects are taken from a pool 650, such as a pool of variably sized blobs or containers. Initially, all objects exist in an array of free lists 610, each free list holding all objects of a given size (e.g., a particular class). Free lists 610 are used to satisfy allocation requests in response to SET operations in the cache. During processing of a SET, an object is plucked from the free list for the appropriately sized object, and inserted into two other lists. First, a hash for the key is computed and used to select a list from an array of lists 630, wherein each entry in the array commonly referred to as a "bucket". The object is inserted into the list chosen for the given hash, and then inserted into a doubly-linked list called the LRU list 620. The LRU list 620 is used very much like a queue (e.g., the oldest entry is the one returned to the allocation pool, i.e. FIFO). The list can be walked backwards from the tail to go from oldest to youngest or forward from the head to go from youngest to oldest. In satisfying new object allocation requests, Memcached walks a few nodes in the list from oldest to youngest to see if any objects in the cache have expired before abandoning the LRU list in favor of satisfying the allocation request from the appropriate free list.

During Memcached initialization, the MWRITE primitive command would provide a way to initialize large numbers of empty blobs with a very small number of round-trips from host to device. The FILL command would facilitate array initialization for setting up the requisite list arrays.

The host application would maintain pointers to device memory representing the various lists required to implement the needed functionality. Using pointers to lists and blobs in device memory (e.g., stored in the meta-fields of FIGS. 5A-B), the computed blob pointers would be added to the various free lists on startup while the head and tails of the bucket and LRU lists would be initialized to NULL.

On processing a SET command, the host would enqueue an ALLOC command passing the LIST pointer for the pre-constructed list containing blobs of the appropriate size. Using the blob pointer returned by ALLOC, the host would enqueue a BLOB_WRITE_DATA command to initialize the allocated blob, and LINK commands for the relevant LRU and bucket lists. To minimize round-trips through the queue, the ability to enqueue command chains would allow the host to construct a chain of ALLOC→BLOB_WRITE_DATA-→LINK→LINK with the BLOB returned by each command passed in as the input blob to the following command in the chain. Command chains allow for reduced queuing latency and simplify the implementation of operations encompassing multiple primitives.

On processing a GET command, the host would compute a hash and enqueue a SELECT command, having constructed a CRITERIA that compares the requested key for equality. Alternatively, the SMC controller could implement the hash function and fully automate the selection of a bucket list and subsequent key comparisons.

Figure 7:
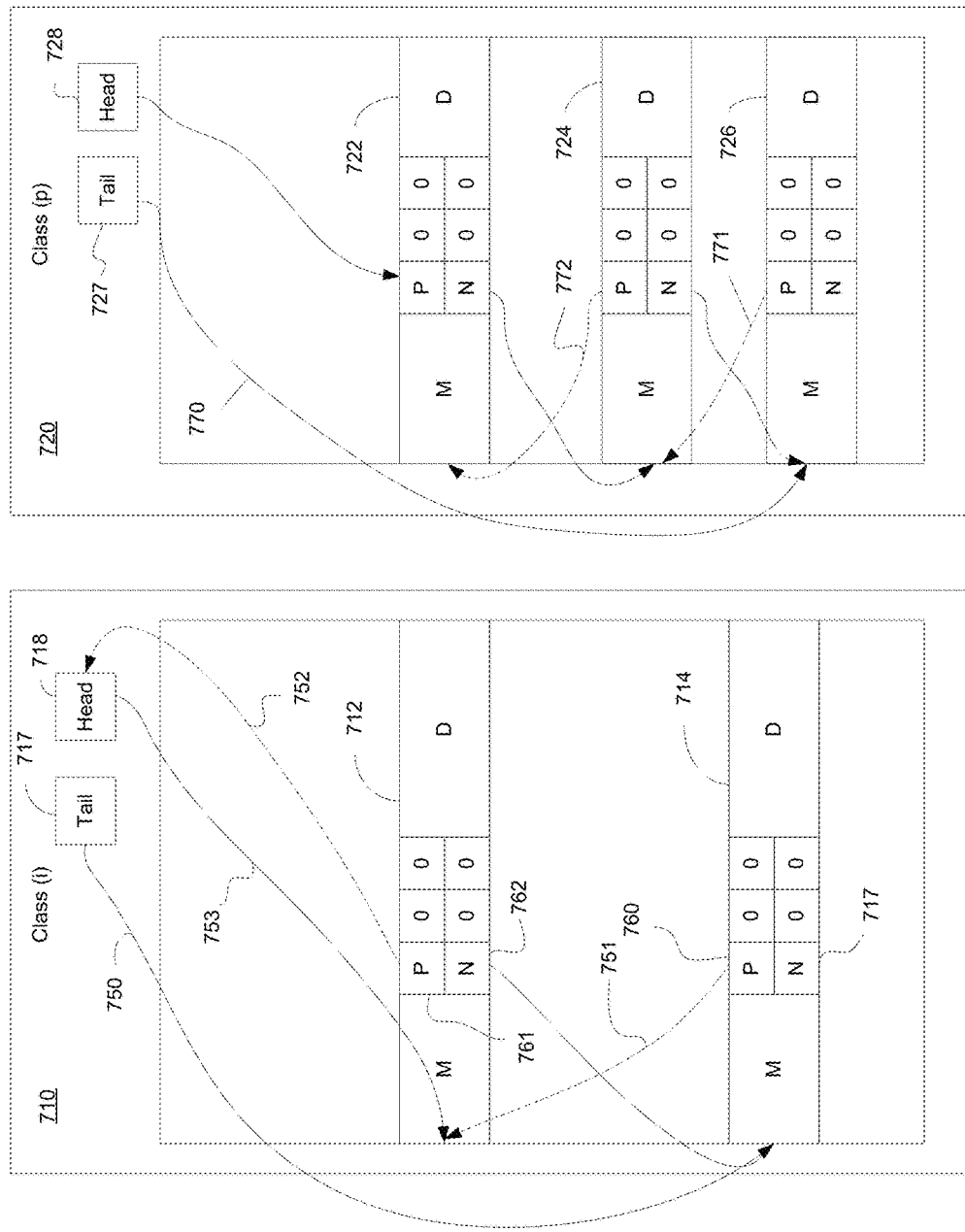
FIG. 7 is an illustration of the classifications of variably sized containers within free lists, in accordance with one embodiment of the present disclosure.

FIG. 7 is an illustration of the classifications of variably sized containers within free lists, in accordance with one embodiment of the present disclosure. For example, a memory structure may include two classes of containers (e.g., blobs). The first class (i) is defined in a free list 710 that includes container 712 and 714. A second class (p) is defined in free list 720, and includes containers 722, 724, and 726. As shown, containers in class (i) are of a first size, and containers in class (p) are of a second size, wherein the sizes are different to accommodate varying sized of data. In order to manage the allocation of containers within a memory structure, containers can be ordered and listed in free lists (e.g., 710 and 720) within a classification so that each is available for inclusion within other linked lists of the memory structure. For example, an available container within free list 710 may be allocated to a linked list of related containers, at which point that container is removed from the free list. The variably sized containers may be implemented within Memecached memory structure 600 of FIG. 6. In addition, the containers included within the free lists 710 and 720 may be implemented by the memory appliances 100A-B, memory system 200, memory appliance 310, and memory appliance 460 of FIGS. 1A-B and 2-4.

The free list 710 for class (i) can be walked backwards from the tail 717 to the head 718. The containers may be listed from oldest to youngest, or youngest to oldest. For instance, when walking from tail 717 along path 750 towards the head 718, container 714 is next. From container 714, the previous pointer 760 points to container 712 along path 751. Again, from container 712, the previous pointer 761 points to head 718, along path 752. Similarly, the class (i) can be walked from head 718 to tail by following path 753 to container 712. The next pointer 762 points to container 714. In container 714, the next pointer 763 will point to the tail 717.

Similarly, the free list for 720 for class (p) can be walked backward from the tail 727 to head 728. For instance, when walking from tail 727 along path 770 toward head 728, container 726 is next. From container 726, the previous pointer points to container 724 along path 771. From container 724, the previous pointer points to container 722 along path 772. In container 722, the previous pointer will point to the head 728.

Figure 8:
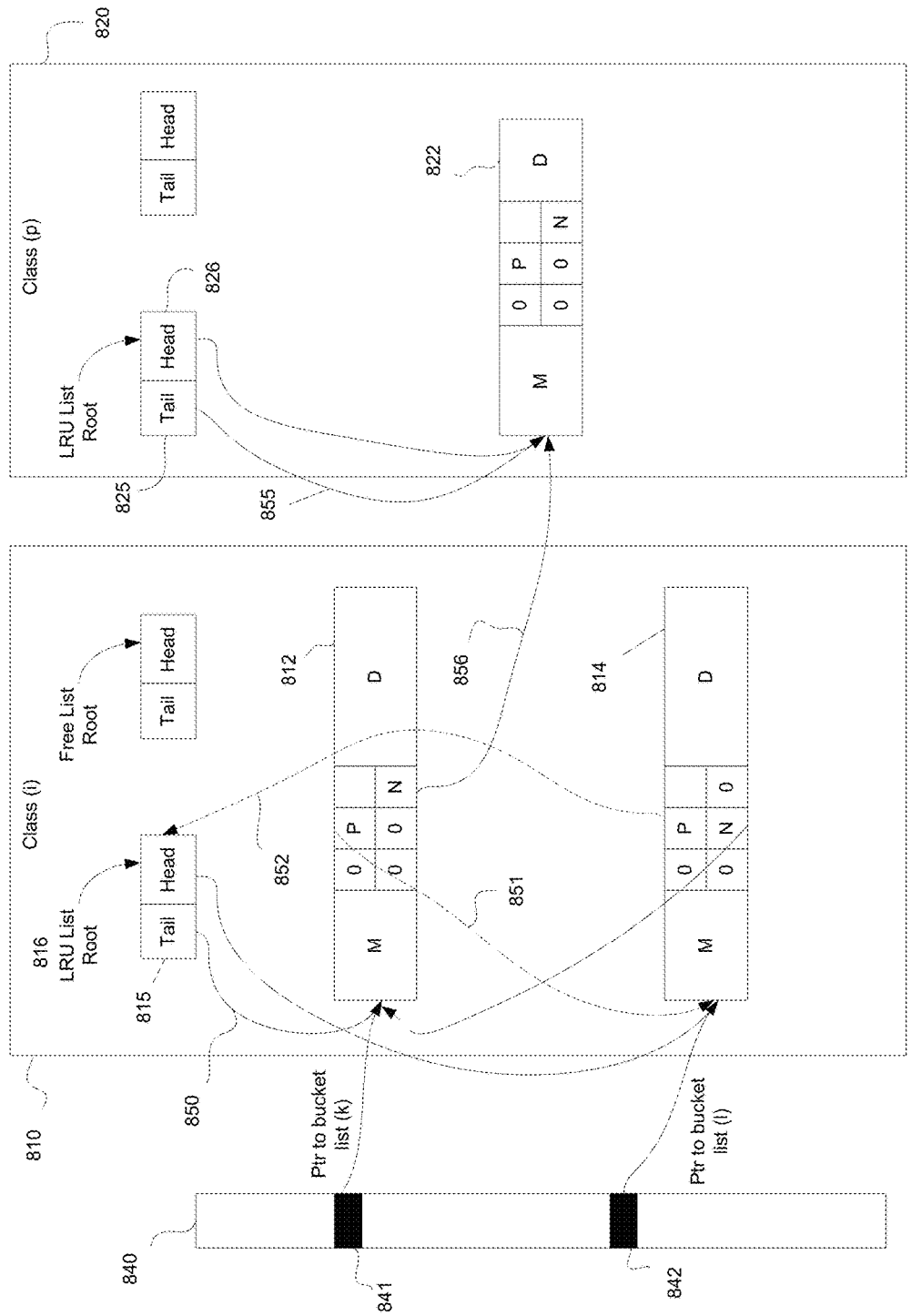
FIG. 8 is an illustration of the LRU container lists within classifications of variably sized containers within free lists, in accordance with one embodiment of the present disclosure.

FIG. 8 is an illustration of LRU container lists within classifications of variably sized containers within free lists (e.g., free lists of FIG. 7), in accordance with one embodiment of the present disclosure. For example, a memory structure may include two classes of containers (e.g., blobs). The first class (i) includes container 812 and 814. A second class (p) includes container 822. As shown, containers in class (i) are of a first size, and containers in class (p) are of a second size, wherein the sizes are different. In order to manage the containers within a memory structure, containers in a free list of a classification may be ordered such that the last recently used container is known. In that manner, containers in a free list may be ordered by use over a period, such that the oldest containers may be allocated before newer containers in the free list. The variably sized containers by class may be implemented within Memecached memory structure 600 of FIG. 6. In addition, the containers included within the lists 810 and 820 may be implemented by the memory appliances 100A-B, memory system 200, memory appliance 310, and memory appliance 460 of FIGS. 1A-B and 2-4.

When walking the containers in class (i) from tail 815 to head 816, container 812 is next following path 850, then container 814 along path 851 from the previous pointer, and then to head 816 along path 852 from the previous pointer. Similarly, when walking the containers in class (p) from tail 825 to head 826, container 822 is next. Since there is only one container in class (p), the previous pointer in container 822 will point to head 826.

In addition, in the Memcached implementation of the memory structure, a key is hashed and matched to one of the values in the hash list 840. For example, a key (of a key-value pair stored in the data portion of a container) that is hashed may be represented by hash 841. That hash 841 points to a bucket list (k). The hash value 841 includes a pointer to the first entry in the bucket list (k), which is container 812. From the relationship information in container 812, the next bucket list pointer leads to container 822 in class (p) along path 856. In that manner, the keys in the data portion of containers 812 and 822 can be matched with the original key (or their hashes can be matched) to determine which container, if any, belongs to the originally presented key. A similar process may be followed to determine if any containers belong to a key that hashes to hash 842 in the list 840.

Figure 9:
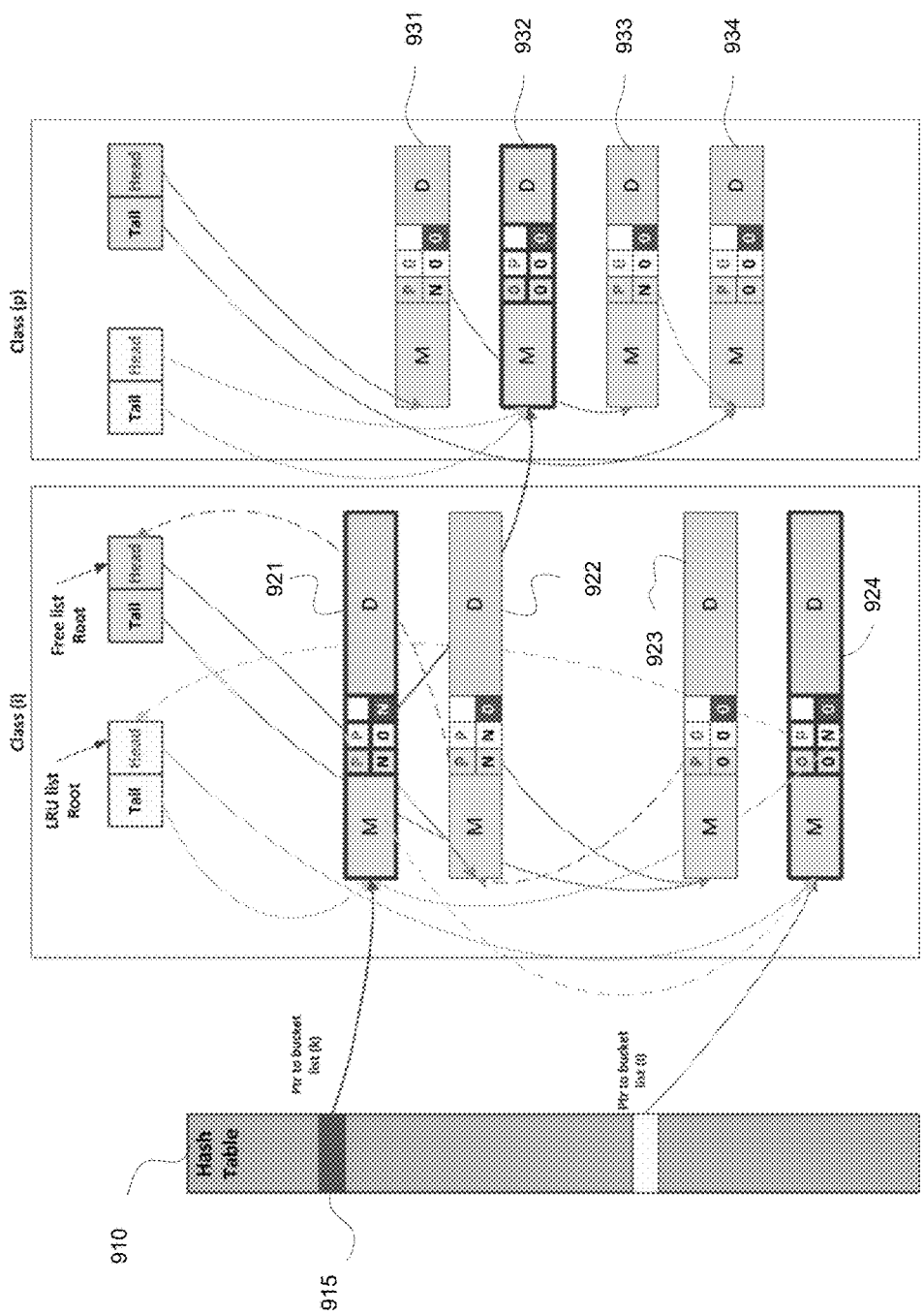
FIG. 9 is an illustration of a combination of free lists and LRU lists within classifications of variably sized containers, in accordance with one embodiment of the present disclosure.

FIG. 9 is an illustration of a combination of free lists and LRU lists within classifications of variably sized containers, in accordance with one embodiment of the present disclosure. In addition, the containers are organized within a Memcached memory structure. For example, a memory structure may include two classes of containers (e.g., blobs). The first class (i) is defined in a free list that includes four containers 921-924. A second class (p) is defined in a free list that includes four containers 931-934. As shown, containers in class (i) are of a first size, and containers in class (p) are of a second size, wherein the sizes are different. In order to manage the containers within a memory structure, containers in classification list may be related such that the last recently used container is known, and free containers are known. The variably sized containers by class may be implemented within Memecached memory structure 600 of FIG. 6. In addition, the containers included within the lists 810 and 820 may be implemented by the memory appliances 100A-B, memory system 200, memory appliance 310, and memory appliance 460 of FIGS. 1A-B and 2-4.

In addition, the hash table 910 allows for keys to be linked to a proper container, and one or more of its associated containers. This is accomplished by walking the bucket list to match keys in containers of the bucket list (e.g., list k) to the originally presented key. For example, bucket list k from hash value 915 includes containers 921 and 932.

Figure 10:
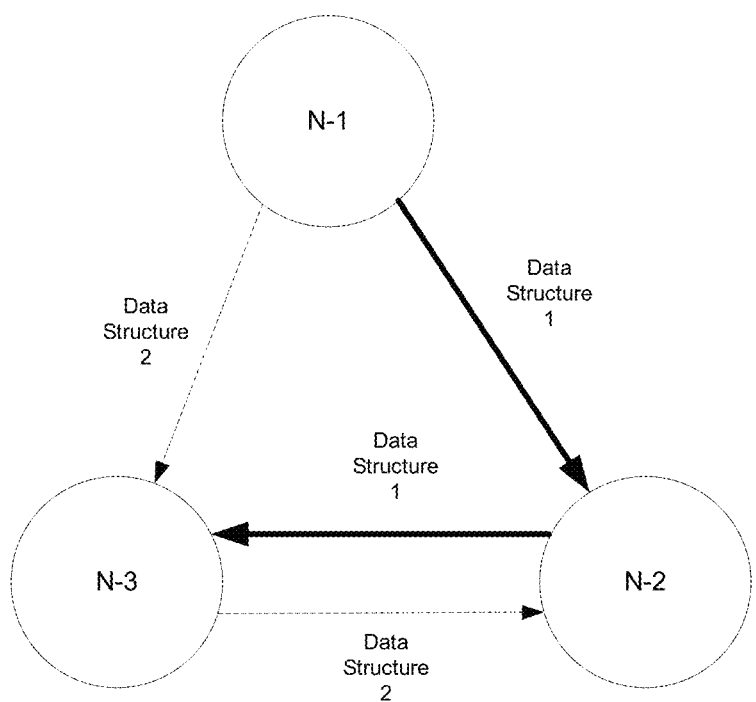
FIG. 10 is an illustration of two memory structures based on the same set of containers within a memory appliance architecture including programmable memory interfaces for accessing memory, in accordance with one embodiment of the present disclosure.

FIG. 10 is an illustration of two memory structures based on the same set of containers 1000 within a memory appliance architecture including programmable memory interfaces for accessing memory, in accordance with one embodiment of the present disclosure. That is, in one memory appliance, depending on how relationships are defined between containers stored in the memory appliance, there may be multiple data structures, such as data structure 1 and data structure 2 shown in FIG. 10. For example, the set of containers includes containers N-1 through N-3. Depending on how these containers are arranged (e.g., as defined by their relationships) multiple memory structures can be defined. That is, by performing an operation on the relationship information of any of the containers in the set 1000, the memory structure is reconfigured. Though the data structures are shown having three containers, it is understood that data structures 1 and 2 may contain any number of variably sized containers, and that the total number of containers may be different in each of the data structures 1 and 2. In that manner, the memory appliance is reconfigurable depending on the defined relationships between containers N-1 through N-3, for example. The memory structures (e.g., data structures 1 and 2) may be implemented by the memory appliances 100A-B, memory system 200, memory appliance 310, and memory appliance 460 of FIGS. 1A-B and 2-4.

For example, data structure 1 includes all three containers N-1, N-2, and N-3, but is defined as having a structure that has container N-1 preceding container N-2, and wherein container N-2 precedes container N-3. For example, the relationship information may define a list and the orders of containers within the list.

In addition, data structure 2 includes all three containers N-1, N-2, and N-3, just as data structure 1. However, data structure 2 is configured differently from data structure 1, and is defined as having a structure with container N-1 preceding container N-3, and wherein container N-3 precedes container N-2.

Data Structures, Types, and Commands

As previously described, low-level memory primitives supporting read and write operations on absolute device memory addresses is supported by the SMC controller to allow the overall memory management required to facilitate the creation and manipulation of key global data structures. The SMC controller supports the allocation of variable-length blobs and their association with various device-based collections in the form of lists. Lists are an enabling vehicle for generalized slab management and free lists, hash tables, queues, command chains, etc. Applications that create blobs can be configured to explicitly anticipate the maximum number of lists that a blob will be a member of, concurrently, during its life time. Each blob contains a variable sized "listentry" array to accommodate list memberships. All blobs contain at least one listentry for use by the slab manager.

In that manner, the primitive commands comprise data manipulation instructions formatted for operation on data stored in linked lists within the device memory. For example, the instructions may include operations configured for accessing data of a linked list; searching data of a linked list; modifying data of a linked list; adding data items to a linked list; and removing data items from a linked list.

A list of commands used to facilitate discovery of SMC resources is provided. For example, an attributes structure containing application relevant SMC information (e.g., starting device address of available memory, size of available memory, etc.) is populated in response to the SMC ATTRS command. Various exemplary primitive commands are listed below.

The "READ <SRC, DST, LENGTH>" primitive command copies an entry from device memory into system memory over a specified length. The "SRC" term defines the device source address. The "DST" term defines the system memory destination address. The "LENGTH" term defines the data length (e.g., in bytes) that are copied. The "READ" primitive command is implementable on containers 500A-B and within memory structure 600 of FIGS. 5A-B and 6, and on containers included within lists of FIGS. 7-9.

The "WRITE <SRC, DST, LENGTH>" primitive command copies from system memory to device memory over a specified length. Again, the SRC" term defines the device source address. The "DST" term defines the system memory destination address. The "LENGTH" term defines the data length (e.g., in bytes) that are copied. The "WRITE" primitive command is implementable on containers 500A-B and within memory structure 600 of FIGS. 5A-B and 6, and on containers included within lists of FIGS. 7-9.

The "LREAD <LIST, OFFSET, LENGTH, DST>" command reads data from a list, wherein the list is a continuous or contiguous block of memory. For example, the memory controller walks the list to fulfill the request. The term "LIST" points to a list in the device memory. The "LREAD" primitive command is implementable on containers 500A-B and within memory structure 600 of FIGS. 5A-B and 6, and on containers included within lists of FIGS. 7-9.

The "LWRITE <SRC, LIST, OFFSET, LENGTH>" primitive command writes data to a list, wherein the list is a continuous or contiguous block of memory. For example, the memory controller walks the list to fulfill the write request. The term "SRC" defines the source address in system memory. The term "LIST" points to the list in device memory. The term "OFFSET" provides for seeking the location across the list of blobs. The term "LENGTH" defines the length of data to be copied. The "LWRITE" primitive command is implementable on containers 500A-B and within memory structure 600 of FIGS. 5A-B and 6, and on containers included within lists of FIGS. 7-9.

The "READFIELDS<*BLOB, COUNT, FIELDID, DST>" primitive command reads a specific blob metadata field into a system memory destination. This command can be performed across multiple blob objects. For example, this command can be used when performing various operations related to cache invalidation, garbage collection, etc. The term "BLOB" defines a system memory pointer to an array of blob pointers. The individual blobs point to device memory. The term "COUNT" defines the number of blobs pointed to by the BLOB array. The term "FIELDID" defines an enumerated value representing a specific metadata field to read. The term "DST" defines a destination buffer in system memory large enough to hold COUNT entries of the data type represented by FIELDID. The "READFIELDS" primitive command is implementable on containers 500A-B and within memory structure 600 of FIGS. 5A-B and 6, and on containers included within lists of FIGS. 7-9.

The "LREADFIELD<LIST, COUNT, FIELDID, DST>" command reads a specific field from each of the blobs in a list, and place the values continuously and/or contiguously in the DST. The term "LIST" defines a list pointer in device memory of the list to traverse for reading fields. The term "COUNT" defines the maximum number of fields that can be held by the DST buffer. The term "FIELDID" defines the field from each BLOB structure to be read. The term "DST" defines the destination buffer for writing data fields. The "LREADFIELD" primitive command is implementable on containers 500A-B and within memory structure 600 of FIGS. 5A-B and 6, and on containers included within lists of FIGS. 7-9.

The "WRITEFIELDS<*BLOB, COUNT, FIELDID, SRC>" command reads a specific blob metadata field into a device memory destination. This command is implementable across multiple blob objects. For example, this command can be used when performing various operations related to cache invalidation, garbage collection, etc. The term "BLOB" defines a system memory pointer to an array of blob pointers. The individual blobs point to device memory. The term "COUNT" defines the number of blobs pointed to by the BLOB array. The term "FIELDID" defines the enumerated value representing a specific metadata field to write. The term "SRC" defines the source buffer in system memory containing COUNT entries of the data type represented by FIELDID. This array is pre-populated with the values to be written to the BLOB(s) pointed to by the BLOB array, in one implementation. The "WRITEFIELDS" primitive command is implementable on containers 500A-B and within memory structure 600 of FIGS. 5A-B and 6, and on containers included within lists of FIGS. 7-9.

The "MREAD<COUNT, [SRC, DST, LENGTH]>" command is configured to perform multiple read operations, and copying data from device memory to system memory. The term "COUNT" defines the number of read operations being requested. The term "SRC" defines an array of device memory addresses representing the source addresses for the read operation. The term "DST" defines an array of system memory addresses representing the destination addresses into which data is copied. The term "LENGTH" defines an array of respective lengths for each of the read operations being specified. The "MREAD" primitive command is implementable on containers 500A-B and within memory structure 600 of FIGS. 5A-B and 6, and on containers included within lists of FIGS. 7-9.

The "MWRITE<COUNT, [SRC, DST, SIZE]*>" command performs multiple write operations, including copying data from system memory to device memory. The term "COUNT" defines the number of write operations being requested. The term "SRC" defines an array of system memory addresses representing the source addresses for the write operation. The term "DST" defines an array of device memory addresses representing the destination addresses into which data is copied. The term "LENGTH" defines an array of respective lengths for each of the write operations being specified. The "MWRITE" primitive command is implementable on containers 500A-B and within memory structure 600 of FIGS. 5A-B and 6, and on containers included within lists of FIGS. 7-9.

The "ALLOC<LIST>" command unlinks and returns the first blob in the list, increments the blob reference count, and touches the creation and access_time dates. The term "LIST" defines the list from which to allocate a blob. The term "COUNT" defines the number of items left in the list. The "ALLOC" primitive command is implementable on containers 500A-B and within memory structure 600 of FIGS. 5A-B and 6, and on containers included within lists of FIGS. 7-9.

The "PREPEND<LIST, BLOB, INDEX>" inserts a blob at the beginning of a list. The term "LIST" is a pointer to a list in device memory into which the BLOB should be prepended. The term "BLOB" is a pointer to a blob in device memory to prepend into the LIST. The term "INDEX" is a listentry index in the BLOB to use for prepending. The "PREPEND" primitive command is implementable on containers 500A-B and within memory structure 600 of FIGS. 5A-B and 6, and on containers included within lists of FIGS. 7-9.

The "APPEND<LIST, BLOB, INDEX>" command appends a blob to the end of a list. The term "LIST" is a pointer to a list in device memory into which the BLOB should be appended. The term "BLOB" is a pointer to a blob in device memory to append into the list. The term "INDEX" is a listentry index in the BLOB to use for appending. The "APPEND" primitive command is implementable on containers 500A-B and within memory structure 600 of FIGS. 5A-B and 6, and on containers included within lists of FIGS. 7-9.

The "INSERT AFTER<LIST, BLOB1, BLOB2, INDEX>" command inserts BLOB1 after BLOB 2 in a list-LIST. The term "LIST" defines the list into which to insert BLOB1. The term "BLOB1" defines the blob to insert. The term "BLOB2 defines the blob after which to interest BLOB1. The term "INDEX" defines the listentry index to use for inserting. The "INSERT AFTER" primitive command is implementable on containers 500A-B and within memory structure 600 of FIGS. 5A-B and 6, and on containers included within lists of FIGS. 7-9.

The "INSERT BEFORE <LIST, BLOB1, BLOB2, INDEX>" command inserts BLOB1 before BLOB2 in LIST. The term "LIST" defines the list into which to insert BLOB1. The term "BLOB1" defines the blob to insert. The term "BLOB2" defines the blog before which to insert BLOB1. The term "INDEX" defines the listentry index to user for inserting. The "INSERT BEFORE" primitive command is implementable on containers 500A-B and within memory structure 600 of FIGS. 5A-B and 6, and on containers included within lists of FIGS. 7-9.

The "FREE<BLOB>" command will decrement a reference count and link a blob into its free list if ref==0. The command will return a reference count. The command uses the listentry (index 0) reserved for use by the slab manager. Using a reference counting model, it is possible that threads can hold references to blobs that have been "freed". In such a case, when the reference count is not 0 when FREE is invoked, the BLOB will only be added to the free list for subsequent allocation when the outstanding references are decremented by reference holders. Note that DECR_REF-COUNT can result in an implicit free operation. The term "BLOB" defines the blob to free. The "FREE" primitive command is implementable on containers 500A-B and within memory structure 600 of FIGS. 5A-B and 6, and on containers included within lists of FIGS. 7-9.

The "SELECT<LIST, CRITERIA, BLOB, COUNT>" command returns all blobs from the LIST that meet the specified criteria, up to a maximum of COUNT. The fundamental idea is to facilitate multi-selection of blobs within a given list. Use-cases include rapidly identifying cache objects past their expiration date and key comparisons for exact matches in lists representing a specific hash bucket. The "SELECT" primitive command is implementable on containers 500A-B and within memory structure 600 of FIGS. 5A-B and 6, and on containers included within lists of FIGS. 7-9**.

The "LINK<LIST, BLOB, INDEX>" adds a BLOB to a LIST in device memory. The command uses the specific listentry in the BLOB represented by INDEX. The term "LIST" defines the list pointer, in device memory, into which to insert the BLOB. The term "BLOB" defines the blob pointer, in device memory, to insert into the LIST. The term "INDEX" defines the listentry index in the BLOB to use for this LIST. The "LINK" primitive command is implementable on containers 500A-B and within memory structure 600 of FIGS. 5A-B and 6, and on containers included within lists of FIGS. 7-9.

The "UNLINK<LIST, BLOB, INDEX>" removes the BLOB from the LIST, clearing the next and previous pointers in listentry[INDEX]. The term "LIST" defines the pointer in device memory to list containing the blob to unlink. The term "BLOB" defines the pointer to device memory for the BLOB being unlinked. The term "INDEX" defines the listentry index to clear. The "UNLINK" primitive command is implementable on containers 500A-B and within memory structure 600 of FIGS. 5A-B and 6, and on containers included within lists of FIGS. 7-9.

The "DEFINE_LIST<ID,HEAD, TAIL" command will define various parameters for a list, including the identifier, head and tail. The "DEFINE" primitive command is implementable on containers 500A-B and within memory structure 600 of FIGS. 5A-B and 6, and on containers included within lists of FIGS. 7-9.

The "CONDITIONAL_UNLINK<LIST, CRITERIA, INDEX>" command defines an unlink operation on a particular list. The "CONDITIONAL" primitive command is implementable on containers 500A-B and within memory structure 600 of FIGS. 5A-B and 6, and on containers included within lists of FIGS. 7-9.

The "INCR_REFCOUNT<BLOB>" command increments the reference count associated with a blob. The "INCR_REFCOUNT" primitive command is implementable on containers 500A-B and within memory structure 600 of FIGS. 5A-B and 6, and on containers included within lists of FIGS. 7-9.

The "DECR_REFCOUNT<BLOB>" command decrements the reference count for BLOB and links the BLOB back into free list, if ref count goes to 0. Otherwise, the command returns a decremented reference count. The "DECR_REFCOUNT" primitive command is implementable on containers 500A-B and within memory structure 600 of FIGS. 5A-B and 6, and on containers included within lists of FIGS. 7-9.

The "MOVE_MEMBERSHIP<SRC LIST, DST LIST, BLOB, INDEX>" command moves membership of a blob between lists. The "MOVE" primitive command is implementable on containers 500A-B and within memory structure 600 of FIGS. 5A-B and 6, and on containers included within lists of FIGS. 7-9.

The "FILL <BYTE, DST, COUNT>" command fills device memory at DST address with BYTE for length of COUNT. The term "BYTE" defines the byte to fill the device memory with. The term "DST" defines the pointer to device memory where FILL operation begins. The term "COUNT" defines the number of bytes from DST over which is written the value of BYTE. The "FILL" primitive command is implementable on containers 500A-B and within memory structure 600 of FIGS. 5A-B and 6, and on containers included within lists of FIGS. 7-9.

The "BLOB_FILL<BLOB, BYTE>" command fills blob data with BYTE. The term "BLOB" points to device memory for this blob. The term "BYTE" defines the value to fill in BLOB's variable length data. The "BLOB_FILL" primitive command is implementable on containers 500A-B and within memory structure 600 of FIGS. 5A-B and 6, and on containers included within lists of FIGS. 7-9.

The "BLOB_WRITE_DATA<BLOB, SRC, LENGTH>" command overwrites blob data. The term "BLOB" points to device memory for this blob. The term "SRC" defines a pointer to system memory where data to be written resides. The term "LENGTH" defines the length of data to write. The "BLOB_WRITE" primitive command is implementable on containers 500A-B and within memory structure 600 of FIGS. 5A-B and 6, and on containers included within lists of FIGS. 7-9.

The "BLOB AND<BLOB1, BLOB2, BLOB DST>" command performs bitwise AND operation using BLOB1 and BLOB2 variable data storing result in BLOB_DST. The term "BLOB1" defines the first blob operation for bitwise AND operation. The term "BLOB2" defines the second blob operation for bitwise AND operation. The term "BLOB DST" defines the blob resulting from bitwise AND operation of BLOB1 and BLOB2. The "BLOB AND" primitive command is implementable on containers 500A-B and within memory structure 600 of FIGS. 5A-B and 6, and on containers included within lists of FIGS. 7-9.

The "BLOB OR<BLOB1, BLOB2, BLOB DST>" command performs bitwise OR operation using BLOB1 and BLOB2 variable data storing result in BLOB_DST. The term "BLOB1" defines the first blob operation for bitwise OR operation. The term "BLOB2" defines the second blob operation for bitwise OR operation. The term "BLOB DST" defines the blob resulting from bitwise OR operation of BLOB1 and BLOB2. The "BLOB OR" primitive command is implementable on containers 500A-B and within memory structure 600 of FIGS. 5A-B and 6, and on containers included within lists of FIGS. 7-9.

The "BLOB XOR<BLOB1, BLOB2, BLOB DST>" command performs bitwise XOR operation using BLOB 1 and BLOB2 variable data storing result in BLOB_DST. The term "BLOB1" defines the first blob operation for bitwise XOR operation. The term "BLOB2" defines the second blob operation for bitwise XOR operation. The term "BLOB DST" defines the blob resulting from bitwise XOR operation of BLOB1 and BLOB2. The "BLOB XOR" primitive command is implementable on containers 500A-B and within memory structure 600 of FIGS. 5A-B and 6, and on containers included within lists of FIGS. 7-9.

The "BLOB COMPLEMENT <BLOB SRC, BLOB DST>" command performs bitwise 2-s complement operation on BLOB1 storing result in BLOB_DST. The term "BLOB1" defines the blob containing bits for NOT operation. The term "BLOB2" defines the resulting blob. The "BLOB COMPLEMENT" primitive command is implementable on containers 500A-B and within memory structure 600 of FIGS. 5A-B and 6, and on containers included within lists of FIGS. 7-9.

Portions of the detailed descriptions are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "receiving," "selecting," "storing," "loading," "reprogramming," "determining," "searching," "moving," "copying," "deleting," "identifying," "executing," "compiling," "providing," or the like, refer to actions and processes (e.g., flowcharts described herein) of a computer system or similar electronic computing device or processor (e.g., system 1110 of FIG. 11). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory, non-volatile memory or other memory technology, CD-ROM, DVDs or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, RF, infrared and other wireless media. Combinations of any of the above can also be included within the scope of computer-readable media.

Figure 11:
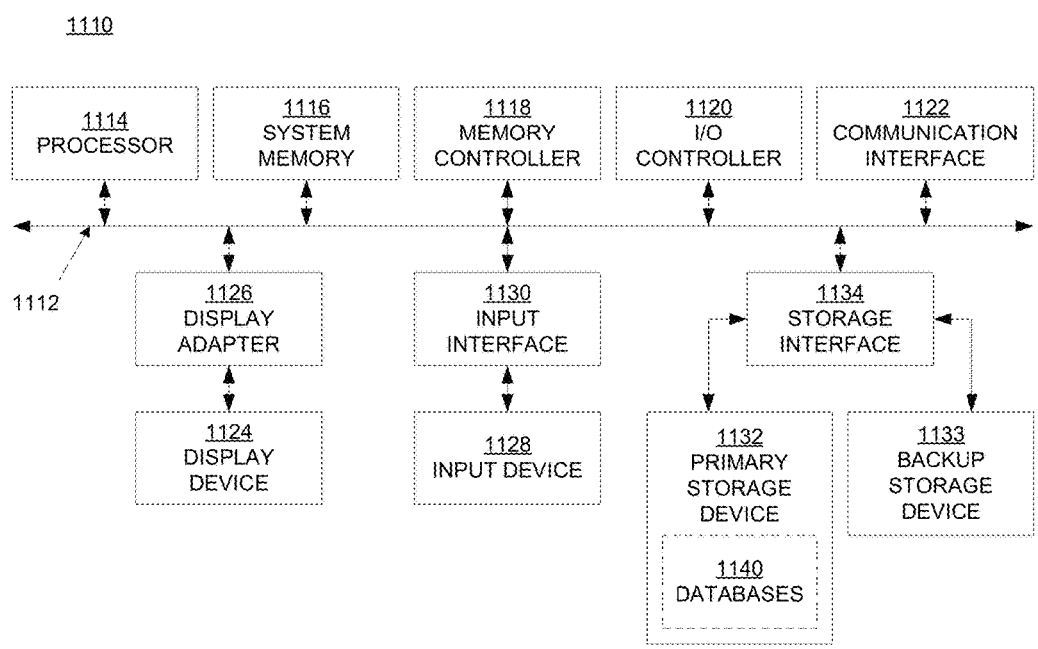
FIG. 11 is a block diagram of an example of a computing system capable of implementing embodiments of the present disclosure.

FIG. 11 is a block diagram of an example of a computing system 1110 capable of implementing embodiments of the present disclosure. Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114 and a system memory 1116.

Processor 1114 generally represents any type or form of processing unit capable of processing data or interpreting and executing instructions. In certain embodiments, processor 1114 may receive instructions from a software application or module. These instructions may cause processor 1114 to perform the functions of one or more of the example embodiments described and/or illustrated herein. For example, processor 1114 may perform and/or be a means for performing, either alone or in combination with other elements, one or more of the identifying, determining, using, implementing, translating, tracking, receiving, moving, and providing described herein. Processor 1114 may also perform and/or be a means for performing any other steps, methods, or processes described and/or illustrated herein.

System memory 1116 generally represents any type or form of volatile or non-volatile storage device or medium capable of storing data and/or other computer-readable instructions. Examples of system memory 1116 include, without limitation, RAM, ROM, flash memory, or any other suitable memory device. Although not required, in certain embodiments computing system 1110 may include both a volatile memory unit (such as, for example, system memory 1116) and a non-volatile storage device (such as, for example, primary storage device 1132.

Computing system 1110 may also include one or more components or elements in addition to processor 1114 and system memory 1116. For example, in the embodiment of FIG. 11, computing system 1110 includes a memory controller 1118, an I/O controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an ISA, PCI, PCIe, or similar bus) and a network. In one embodiment, system memory 1116 communicates via a dedicated memory bus.

Memory controller 1118 generally represents any type or form of device capable of handling memory or data or controlling communication between one or more components of computing system 1110. For example, memory controller 1118 may control communication between processor 1114, system memory 1116, and I/O controller 1120 via communication infrastructure 1112. Memory controller may perform and/or be a means for performing, either alone or in combination with other elements, one or more of the operations or features described herein.

I/O controller 1120 generally represents any type or form of module capable of coordinating and/or controlling the input and output functions of a computing device. For example, I/O controller 1120 may control or facilitate transfer of data between one or more elements of computing system 1110, such as processor 1114, system memory 1116, communication interface 1122, display adapter 1126, input interface 1130, and storage interface 1134. I/O controller 1120 may be used, for example, to perform and/or be a means for performing, either alone or in combination with other elements, one or more of the operations described herein. I/O controller 1120 may also be used to perform and/or be a means for performing other operations and features set forth in the instant disclosure.

Communication interface 1122 broadly represents any type or form of communication device or adapter capable of facilitating communication between example computing system 1110 and one or more additional devices. For example, communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In one embodiment, communication interface 1122 provides a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

Communication interface 1122 may also represent a host adapter configured to facilitate communication between computing system 1110 and one or more additional network or storage devices via an external bus or communications channel. Examples of host adapters include, without limitation, SCSI host adapters, USB host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution. Communication interface 1122 may perform and/or be a means for performing, either alone or in combination with other elements, one or more of the operations disclosed herein. Communication interface 1122 may also be used to perform and/or be a means for performing other operations and features set forth in the instant disclosure.

As illustrated in FIG. 11, computing system 1110 may also include at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, computing system 1110 may also include at least one input device 1128 coupled to communication infrastructure 1112 via an input interface 1130. Input device 1128 generally represents any type or form of input device capable of providing input, either computer- or human-generated, to computing system 1110. Examples of input device 1128 include, without limitation, a keyboard, a pointing device, a speech recognition device, or any other input device. In one embodiment, input device 1128 may perform and/or be a means for performing, either alone or in combination with other elements, one or more of the operations disclosed herein. Input device 1128 may also be used to perform and/or be a means for performing other operations and features set forth in the instant disclosure.

As illustrated in FIG. 11, computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In one example, databases 1140 may be stored in primary storage device 1132. Databases 1140 may represent portions of a single database or computing device or a plurality of databases or computing devices. For example, databases 1140 may represent (be stored on) a portion of computing system 1110 and/or portions of example network architecture 1200 in FIG. 12 (below). Alternatively, databases 1140 may represent (be stored on) one or more physically separate devices capable of being accessed by a computing device, such as computing system 1110 and/or portions of network architecture 1200.

Continuing with reference to FIG. 11, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be separate devices accessed through other interface systems.

Storage devices 1132 and 1133 may be used to perform, and/or be a means for performing, either alone or in combination with other elements, one or more of the operations disclosed herein. Storage devices 1132 and 1133 may also be used to perform, and/or be a means for performing, other operations and features set forth in the instant disclosure.

Many other devices or subsystems may be connected to computing system 1110. Conversely, all of the components and devices illustrated in FIG. 11 need not be present to practice the embodiments described herein. The devices and subsystems referenced above may also be interconnected in different ways from that shown in FIG. 11. Computing system 1110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of the example embodiments described and/or illustrated herein. Additionally or alternatively, the example embodiments described and/or illustrated herein may be implemented in firmware and/or hardware. For example, computing system 1110 may be configured as an ASIC adapted to implement one or more of the embodiments disclosed herein.

Figure 12:
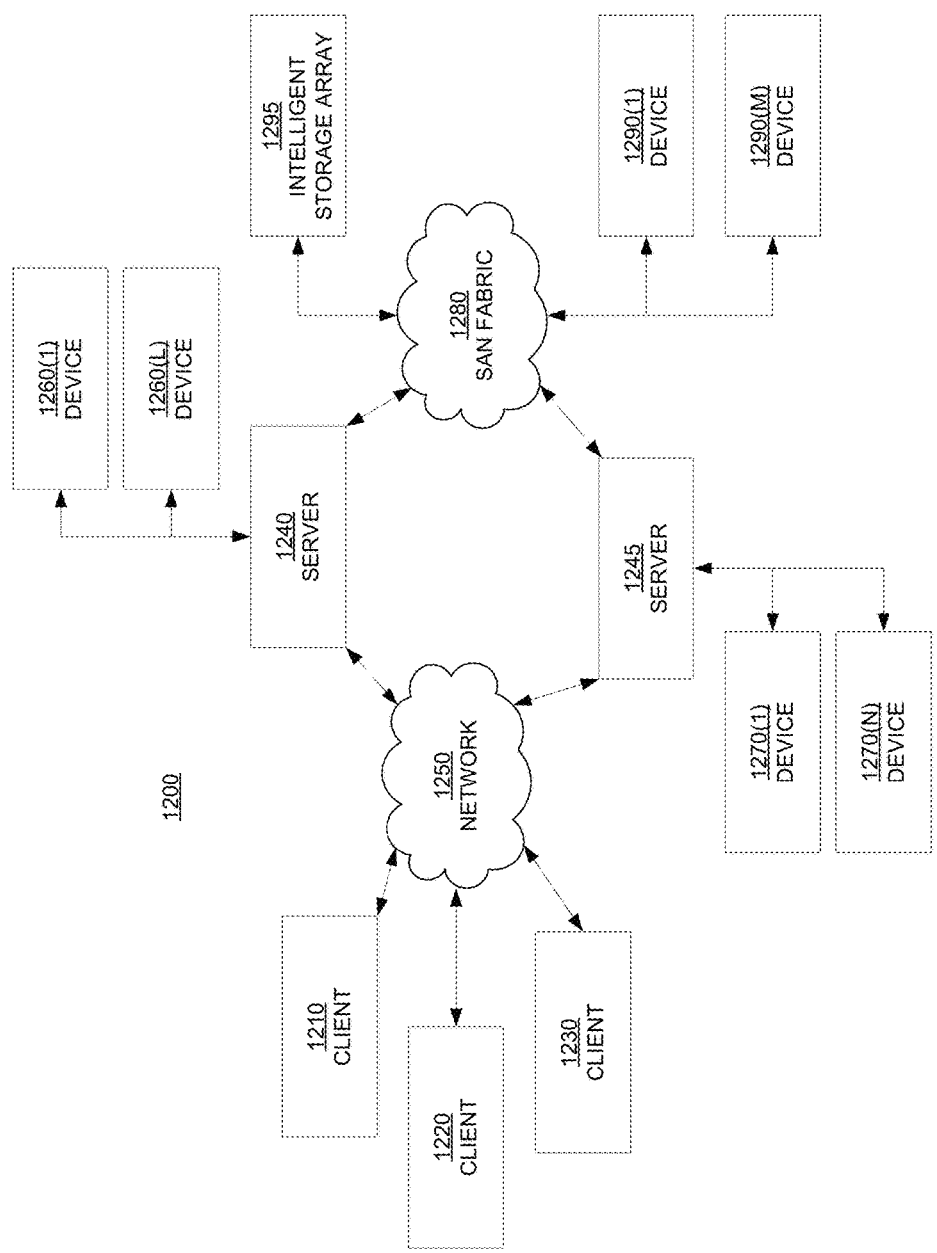
FIG. 12 is a block diagram of an example of a network architecture capable of implementing embodiments of the present disclosure.

FIG. 12 is a block diagram of an example of a network architecture 1200 in which client systems 1210, 1220, and 1230 and servers 1240 and 1245 may be coupled to a network 1250. Client systems 1210, 1220, and 1230 generally represent any type or form of computing device or system, such as computing system 1110 of FIG. 11.

Similarly, servers 1240 and 1245 generally represent computing devices or systems, such as application servers or database servers, configured to provide various database services and/or run certain software applications. Network 1250 generally represents any telecommunication or computer network including, for example, an intranet, a WAN, a LAN, a PAN, or the internet.

As illustrated in FIG. 12, one or more storage devices 1260(1)-(L) may be directly attached to server 1240. Similarly, one or more storage devices 1270(1)-(N) may be directly attached to server 1245. Storage devices 1260(1)-(L) and storage devices 1270(1)-(N) generally represent any type or form of storage device or medium capable of storing data and/or other computer-readable instructions. Storage devices 1260(1)-(L) and storage devices 1270(1)-(N) may represent network-attached storage (NAS) devices configured to communicate with servers 1240 and 1245 using various protocols, such as NFS, SMB, or CIFS.

Servers 1240 and 1245 may also be connected to a storage area network SAN fabric 1280. SAN fabric 1280 generally represents any type or form of computer network or architecture capable of facilitating communication between storage devices. SAN fabric 1280 may facilitate communication between servers 1240 and 1245 and storage devices 1290(1)-(M) and/or an intelligent storage array 1295. SAN fabric 1280 may also facilitate, via network 1250 and servers 1240 and 1245, communication between client systems 1210, 1220, and 1230 and storage devices 1290(1)-(M) and/or intelligent storage array 1295 in such a manner that devices 1290(1)-(M) and array 1295 appear as locally attached devices to client systems 1210, 1220, and 1230. As with storage devices 1260(1)-(L) and storage devices 1270(1)-(N), storage devices 1290(1)-(M) and intelligent storage array 1295 generally represent any type or form of storage device or medium capable of storing data and/or other computer-readable instructions.

With reference to computing system 1110 of FIG. 11, a communication interface, such as communication interface 1122, may be used to provide connectivity between each client system 1210, 1220, and 1230 and network 1250. Client systems 1210, 1220, and 1230 may be able to access information on server 1240 or 1245 using, for example, a Web browser or other client software. Such software may allow client systems 1210, 1220, and 1230 to access data hosted by server 1240, server 1245, storage devices 1260(1)-(L), storage devices 1270(1)-(N), storage devices 1290(1)-(M), or intelligent storage array 1295. Although FIG. 12 depicts the use of a network (such as the Internet) for exchanging data, the embodiments described herein are not limited to the Internet or any particular network-based environment.

Returning to FIG. 12, in one embodiment, all or a portion of one or more of the example embodiments disclosed herein are encoded as a computer program and loaded onto and executed by server 1240, server 1245, storage devices 1260(1)-(L), storage devices 1270(1)-(N), storage devices 1290(1)-(M), intelligent storage array 1295, or any combination thereof. All or a portion of one or more of the example embodiments disclosed herein may also be encoded as a computer program, stored in server 1240, run by server 1245, and distributed to client systems 1210, 1220, and 1230 over network 1250. Accordingly, network architecture 1200 may perform and/or be a means for performing, either alone or in combination with other elements, one or more of the operations disclosed herein. Network architecture 1200 may also be used to perform and/or be a means for performing other operations and features set forth in the instant disclosure.

The above described embodiments may be used, in whole or in part, in systems that process large amounts of data and/or have tight latency constraints, and, in particular, with systems using one or more of the following protocols and formats: Key-Value (KV) Store, Memcached, Redis, Neo4J (Graph), Fast Block Storage, Swap Device, and Network RAMDisk. In addition, the above described embodiments may be used, in whole or in part, in systems employing virtualization, Virtual Desktop Infrastructure (VDI), distributed storage and distributed processing (e.g., Apache Hadoop), data analytics cluster computing (e.g., Apache Spark), Infrastructure as a Service (IaaS), Platform as a Service (PaaS), and other cloud computing platforms (e.g., Vmware vCloud, Open Stack, and Microsoft Azure). Further, the above described embodiments may be used, in whole or in party, in systems conducting various types of computing, including Scale Out, Disaggregation, Multi-Thread/Distributed Processing, RackScale, Data Center Scale Computing, Elastic Memory Provisioning, Memory as a Service, page migration and caching and Application Offloading/Acceleration and Integration, using various types of storage, such as Non-Volatile Memory Express, Flash, Multi-Tenancy, Internet Small Computer System Interface (iSCSI), Object Storage, Scale Out storage, and using various types of networking, such as 10/40/100 GbE, Software-Defined Networking, Silicon Photonics, Rack TOR Networks, and Low-Latency networking.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the disclosure and its practical applications, to thereby enable others skilled in the art to best utilize the various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A memory appliance system comprising:
a plurality of memory devices storing data in a plurality of containers, the plurality of containers comprising a first container and a second container that each comprise: metadata, a payload, and relationship information, the relationship information of the first container associating the first container with a first number of related containers stored in the memory devices and the relationship information of the second container associating the second container with a second number of related containers stored in the memory devices, wherein the second number of related containers are different than the first number of related containers; and
a controller configured to perform data operations on the payload of the respective first and second containers and on payload of the respective related containers based on the relationship information associating the respective containers with the respective related containers.

2. The memory appliance system of claim 1, wherein said plurality of containers comprises blobs.

3. The memory appliance system of claim 1, further comprising a memory structure comprising a first free list of blobs, wherein said first free list comprises a first classification of blobs each comprising a payload of a first size.

4. The memory appliance system of claim 3, wherein said memory structure further comprises a second free list of blobs, wherein said second free list comprises a second classification of blobs each comprising a payload of a second size.

5. The memory appliance system of claim 1, wherein said data operations comprise a plurality of primitive commands comprising data manipulation instructions formatted to operate on data stored in a plurality of linked lists of blobs.

6. The memory appliance system of claim 5, wherein said data manipulation instructions comprise one or more of:
accessing data of a corresponding linked list of blobs;
searching data of a corresponding linked list of blobs;
modifying data of a corresponding linked list of blobs;
adding data items to a corresponding linked list of blobs; or
removing data items from a corresponding linked list of blobs.

7. The memory appliance system of claim 5, wherein said data manipulation instructions comprise one or more of:
unlinking a blob from a linked list and allocating said blob to a free list of a corresponding classification of blobs;
adding a blob to a corresponding linked list of blobs; or
removing a blob from a corresponding linked list of blobs.

8. The memory appliance system of claim 5, wherein said data manipulation instructions comprise one or more of:
prepending a blob from a free list of a corresponding classification of blobs to a beginning of a linked list of blobs;
appending a blob from a free list of a corresponding classification of blobs to an end of a linked list of blobs;
inserting a blob from a free list of a corresponding classification of blobs after a first blob in a linked list of blobs; or
inserting a blob from a free list of a corresponding classification of blobs before a first blob in a linked list of blobs.

9. The memory appliance system of claim 5, wherein said data manipulation instructions comprise returning all blobs from a linked list of blobs that meet a criteria.

10. A memory appliance system comprising:
a processor operable to be coupled to one or more communication channels with a command interface, said processor to communicate commands over said one or more communication channels; and
a plurality of memory units coupled to said processor through said one or more communication channels, wherein each memory unit comprises a memory unit controller and a plurality of memory devices, wherein a reconfigurable memory structure is stored in said plurality of memory devices, wherein said reconfigurable memory structure comprises a plurality of variably sized blobs comprising a first blob and a second blob that each comprise: metadata, a payload, and relationship information, the relationship information of the first blob associating the first blob with a first number of other blobs and the relationship information of the second blob associating the second blob with a second number of other blobs, wherein the second number of other blobs are different than the first number of other blobs;
wherein said memory unit controller is configured to perform data operations on the payload of said respective blob and on payload of said one or more respective other blobs based on the relationship information associating the respective blob with the respective other blobs.

11. The memory appliance system of claim 10, wherein said reconfigurable memory structure comprises:
a first free list of blobs, wherein said first free list comprises a first classification of blobs each comprising a payload of a first size; and
a second free list of blobs, wherein said second free list comprises a second classification of blobs each comprising a payload of a second size.

12. The memory appliance system of claim 10, wherein said data operations comprise a plurality of primitive commands comprising data manipulation instructions formatted to operate on data stored in a plurality of linked lists of blobs.

13. The memory appliance system of claim 12, wherein said data manipulation instructions comprise one or more of:
accessing data of a corresponding linked list of blobs;
searching data of a corresponding linked list of blobs;
modifying data of a corresponding linked list of blobs;
adding data items to a corresponding linked list of blobs; or
removing data items from a corresponding linked list of blobs.

14. The memory appliance system of claim 12, wherein said data manipulation instructions comprise one or more of:
unlinking a blob from a linked list and allocating said blob to a free list of a corresponding classification of blobs;
adding a blob to a corresponding linked list of blobs; or
removing a blob from a corresponding linked list of blobs.

15. A memory appliance system comprising:
a plurality of memory devices storing data in a reconfigurable key-value store memory structure comprising a plurality of containers comprising a first container and a second container that each comprise: metadata a payload, and relationship information, the relationship information of the first container associating the first container with a first number of other containers and the relationship information of the second container associating the second container with a second number of other containers, wherein the second number of other containers are different than the first number of other containers; and
a controller configured to perform data operations on the payload of the respective container and on payload of the respective other containers based on the relationship information associating the respective container with the respective other containers.

16. The memory appliance system of claim 15, wherein said memory structure comprises a Memecached memory structure that is accessed through a plurality of Memcached key-value operations.

17. The memory appliance system of claim 15, wherein said Memcached memory structure comprises a list of hash values, wherein each of the hash values is associated to a bucket list of key-value pairs.

18. The memory appliance system of claim 15, wherein said data operations comprise a plurality of primitive commands comprising data manipulation instructions formatted to operate on data stored in a plurality of linked lists of blobs.

19. The memory appliance system of claim 18, wherein said data manipulation instructions comprise one or more of:
accessing data of a corresponding linked list of blobs;
searching data of a corresponding linked list of blobs;
modifying data of a corresponding linked list of blobs;
adding data items to a corresponding linked list of blobs;
removing data items from a corresponding linked list of blobs;
unlinking a blob from a linked list and allocating said blob to a free list of a corresponding classification of blobs;
adding a blob to a corresponding linked list of blobs;
removing a blob from a corresponding linked list of blobs;
prepending a blob from a free list of a corresponding classification of blobs to a beginning of a linked list of blobs;
appending a blob from a free list of a corresponding classification of blobs to an end of a linked list of blobs;
inserting a blob from a free list of a corresponding classification of blobs after a first blob in a linked list of blobs;
inserting a blob from a free list of a corresponding classification of blobs before a first blob in a linked list of blobs; or
returning all blobs from a linked list of blobs that meet a criteria.

20. A memory appliance system comprising:
a plurality of memory devices storing data in a plurality of containers, the plurality of containers comprising:
a first container comprising:
first metadata,
first relationship information associating the first container with a first number of other containers stored in the plurality of memory devices, and
a first payload;
a second container comprising:
second metadata,
second relationship information associating the second container with a second number of other containers stored in the plurality of memory devices, the second number of other containers being different than the first number of other containers, and
a second payload; and
a controller being configured to perform data operations on:
the first payload of the first container,
based on the first relationship information associating the first container with the first number of other containers stored in the plurality of memory devices, a payload of the first number of other containers stored in the plurality of memory devices,
the second payload of the second container, and
based on the second relationship information associating the second container with the second number of other containers stored in the plurality of memory devices, and a payload of the second number of other containers stored in the plurality of memory devices.

* * * * *